US008979100B2

(12) United States Patent
Bensman et al.

(10) Patent No.: US 8,979,100 B2
(45) Date of Patent: Mar. 17, 2015

(54) MODULAR CONTAINER ASSEMBLY

(71) Applicant: The Stanley Works Israel Ltd., Rosh Ha'Ayin (IL)

(72) Inventors: Mark Bensman, Rosh Ha'Ayin (IL); Nadin Daniel Horovitz, Rehovot (IL)

(73) Assignee: The Stanley Works Israel, Ltd., Rosh Ha'Ayin (IL)

( * ) Notice: Subject to any disclaimer, the term of this patent is extended or adjusted under 35 U.S.C. 154(b) by 94 days.

(21) Appl. No.: 13/680,236

(22) Filed: Nov. 19, 2012

(65) Prior Publication Data
US 2013/0127129 A1      May 23, 2013

Related U.S. Application Data

(60) Provisional application No. 61/562,845, filed on Nov. 22, 2011.

(51) Int. Cl.
*B62B 1/12* (2006.01)
*B65D 21/02* (2006.01)
*B62B 5/00* (2006.01)
*B65D 85/00* (2006.01)
*B25H 3/02* (2006.01)

(52) U.S. Cl.
CPC .............. *B65D 21/0209* (2013.01); *B62B 5/00* (2013.01); *B65D 85/00* (2013.01); *B25H 3/021* (2013.01)
USPC ..................................... 280/47.26; 280/47.18

(58) Field of Classification Search
USPC ........ 280/47.131, 47.17, 47.19, 47.24, 47.18, 280/47.26
See application file for complete search history.

(56) References Cited

U.S. PATENT DOCUMENTS

| 968,633 | A | * | 8/1910 | Andrews | 220/8 |
|---|---|---|---|---|---|
| 5,575,401 | A | * | 11/1996 | Trower et al. | 220/522 |
| 6,371,320 | B2 | | 4/2002 | Sagol | |
| 6,761,366 | B1 | * | 7/2004 | Klemmensen et al. | 280/47.26 |
| 2002/0030425 | A1 | | 3/2002 | Tiramani | |
| 2005/0224384 | A1 | | 10/2005 | Sands et al. | |
| 2007/0012694 | A1 | | 1/2007 | Duvigneau | |

OTHER PUBLICATIONS

Bogdan Gavaza, European Search Report, Jul. 25, 2014, The Hague, Netherlands.
Annex to the European Search Report on European Patent Application No. EP 12 19 3070, Jul. 25, 2014.

* cited by examiner

*Primary Examiner* — Hau Phan
*Assistant Examiner* — Bryan Evans
(74) *Attorney, Agent, or Firm* — Gabriel A. Haboubi

(57) ABSTRACT

An apparatus for transporting articles between working locations including a first container comprising a first latch engagement structure and a second latch engagement structure and a second container comprising a latch. The latch selectively engages with 1) the first latch engagement structure of the first container to latch the first and second containers in a first configuration or 2) the second latch engagement structure of the first container to latch the first and second containers in a second configuration. A third container is configured to be positioned between the first and second containers. In the first configuration, one of the first and second containers is arranged on top of the other of the first and second containers without the third container therebetween. In the second configuration, the third container is provided between the first and second containers.

21 Claims, 23 Drawing Sheets

MODULAR CONTAINER ASSEMBLY

CROSS-REFERENCE TO RELATED APPLICATIONS

The present application claims priority to U.S. Provisional Application No. 61/562,845, filed on 22 Nov. 2011 and entitled "Modular Container Assembly," the disclosure of which is hereby incorporated by reference in its entirety.

FIELD OF THE INVENTION

The present invention relates to a container assembly.

BACKGROUND OF THE INVENTION

Container assemblies are commonly used to carry a plurality of working tools to and from a working location. There is a need in the art for an improved container assembly with enhanced modularity attributes.

BRIEF SUMMARY OF THE INVENTION

One aspect of the invention provides an apparatus for transporting articles between working locations that includes a first container comprising a first latch engagement structure and a second latch engagement structure and a second container comprising a latch. The latch is constructed and arranged to selectively engage with 1) the first latch engagement structure of the first container to latch the first and second containers in a first configuration or 2) the second latch engagement structure of the first container to latch the first and second containers in a second configuration. The apparatus also includes a third container configured to be positioned between the first and second containers. In the first configuration, one of the first and second containers is arranged on top of the other of the first and second containers without the third container therebetween. In the second configuration, the third container is provided between the first and second containers.

The first container may be a tool box, which may comprise a telescopic handle. The second container may be a base storage unit. The first container may be a base storage unit. The second container may be a toolbox, which may comprise a telescopic handle.

Another aspect provides an apparatus for transporting articles between working locations including one or more rotatable ground engaging wheels mounted towards the bottom of the apparatus for rotation about an axis to provide rolling support for the apparatus and a manually engageable pulling handle, the pulling handle. The one or more ground engaging wheels are arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction. The apparatus also includes a first container comprising a first latch engagement structure and a second latch engagement structure and a second container comprising a latch. The latch is constructed and arranged to selectively engage with 1) the first latch engagement structure of the first container to latch the first and second containers in a first configuration or 2) the second latch engagement structure of the first container to latch the first and second containers in a second configuration. The apparatus also includes a third container configured to be positioned between the first and second containers. In the first configuration, one of the first and second containers is arranged on top of the other of the first and second containers without the third container therebetween. In the second configuration, the third container is provided between the first and second containers.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein can be considered drawn to scale. It is to be expressly understood, however, that the drawings are for the purpose of illustration and description only and are not a limitation of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

DETAILED DESCRIPTION OF THE INVENTION

Figure 1:
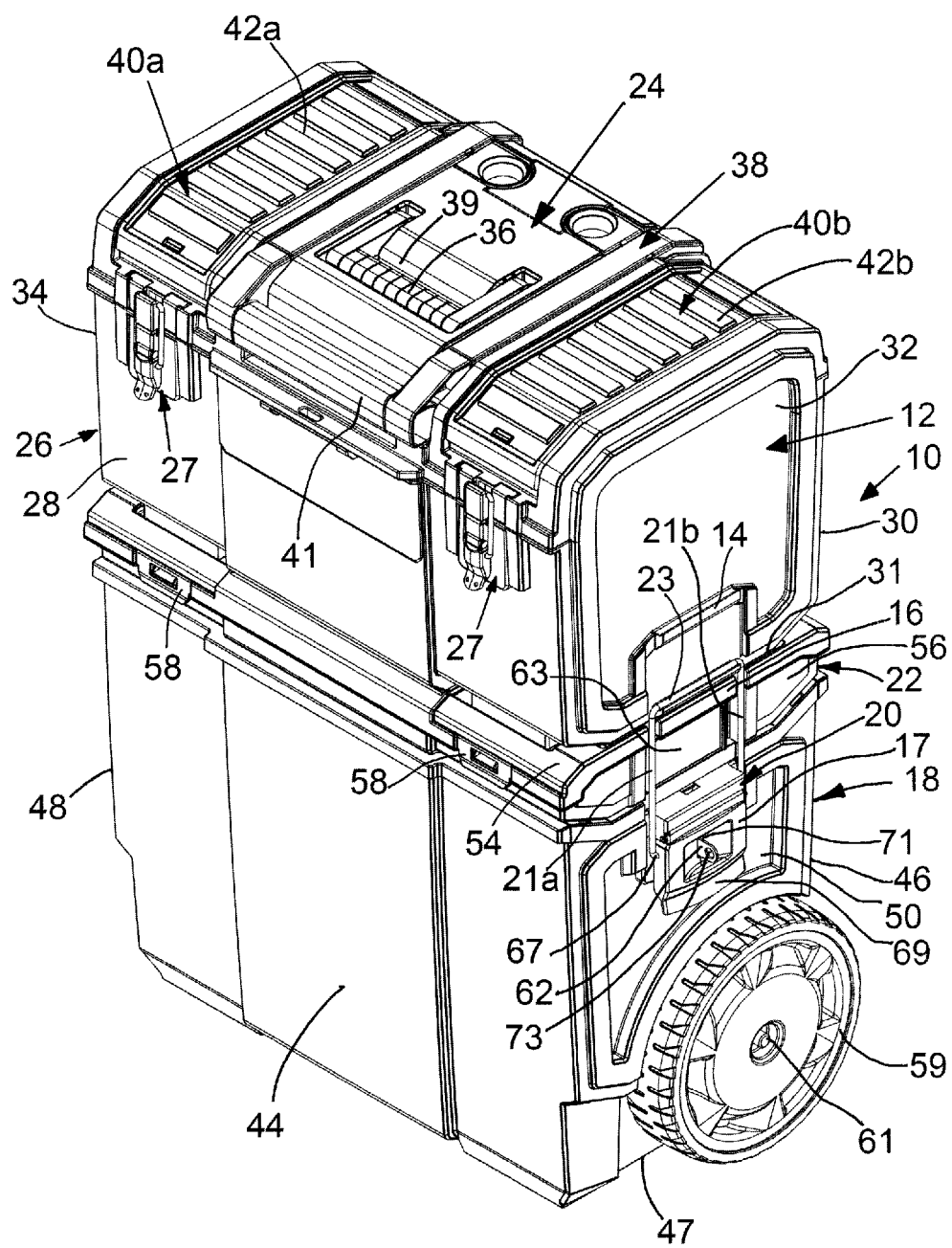
FIG. 1 is a perspective view of an apparatus having first and second containers in a second configuration with a third container located therebetween, in accordance with an embodiment.
Figure 7:
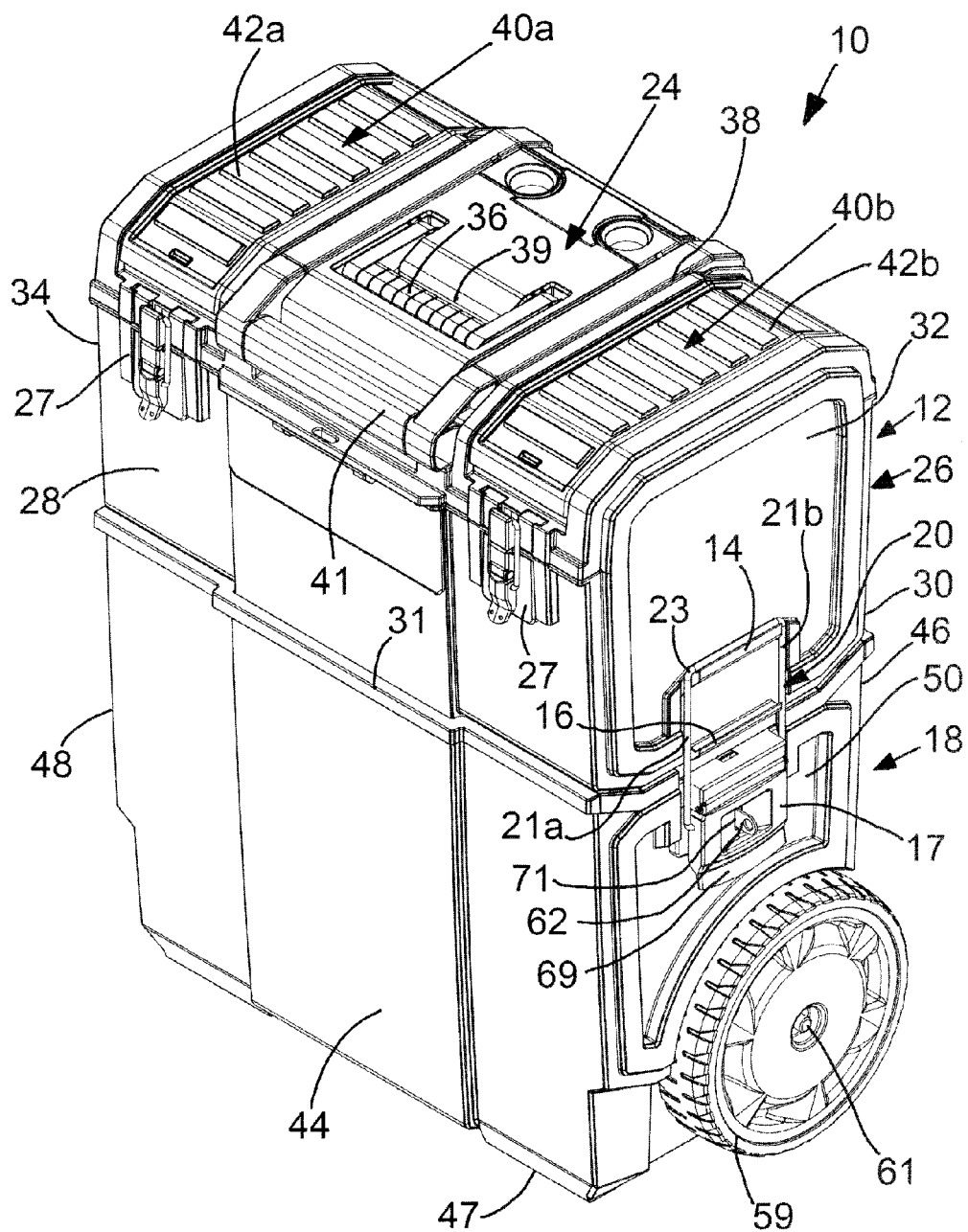
FIG. 7 is a perspective view of an apparatus having the first and second containers in a first configuration, in accordance with an embodiment.

FIG. 1 shows an apparatus 10 for transporting articles between working locations. The apparatus includes a first container 12 having a first latch engagement structure 14 and a second latch engagement structure 16. The apparatus includes a second container 18 comprising a latch 20, wherein the latch 20 is constructed and arranged to selectively engage with 1) the first latch engagement structure 14 of the first container 12 to latch the first and second containers 12, 18 in a first configuration or 2) the second latch engagement structure 16 of the first container 12 to latch the first and second containers 12, 18 in a second configuration. A third container 22 is configured to be positioned between the first and second containers 12, 18. In the first configuration, for example, as shown in FIG. 7, one of the first and second containers 12, 18 is arranged on top of the other of the first and second containers 12, 18 without the third container 22 therebetween. In the second configuration, for example, as shown in FIG. 1, the third container 22 is provided between the first and second containers 12, 18.

Figure 3:
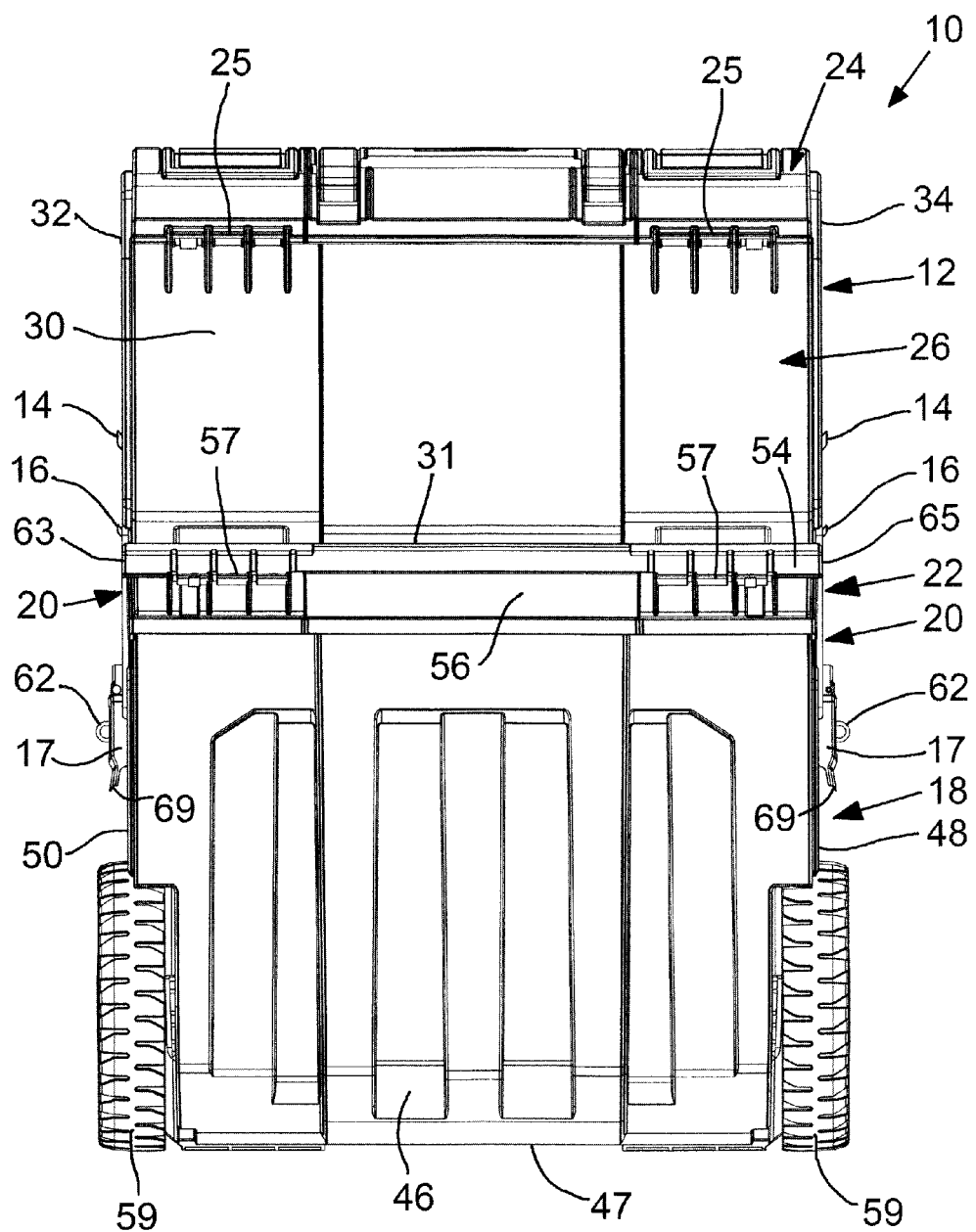
FIG. 3 is a side view of the apparatus of the embodiment shown in FIG. 1.

As shown in the embodiment of FIG. 1, the first container 12 is a toolbox having a container top 24 and a container portion 26. The container top 24 and the container portion 26 may be latched together using latches 27. In this embodiment, the container top 24 is pivotable relative to the container portion 26 via hinges 25 (see FIG. 3) to permit or prevent access to an interior space 19 (see FIG. 25) of the container portion 26. Referring back to FIG. 1, a pivotable handle 36 may be provided on the container top 24 to facilitate transport of the first container 12. In one embodiment, the handle 36 may be provided in a recessed portion 39 of the container top 24. An apparatus handle 38, which may be a manually engageable pulling handle, having a grip portion 41 may also be provided on the container top 24 to facilitate transport of the apparatus 10 when the first container 12 is latched to the second container 18. The apparatus handle 38 may be pivotable and may optionally be extendible or telescopic, which will be described in more detail later. The first container 12 may also include upper storage portions 40a, 40b provided on the container top 24. The upper storage portions 40a, 40b may be provided with lids 42a, 42b that are constructed and arranged to permit or prevent access to interior spaces (obstructed from view in this Figure) of the upper storage portions 40a, 40b. Grooves or indentations may be provided on the lids 42a, 42b. The storage portions 40a, 40b are optional and may not be provided in some embodiments. The lids 42a, 42b may be constructed and arranged to be pivotable, slideable, snap off, or may have other methods of moving to permit or prevent access to the interior spaces of the upper storage portions 40a, 40b. The container portion 26 includes a front wall 28, a rear wall 30, bottom wall 31, and side walls 32, 34.

As further shown in the embodiment of FIG. 1, the second container 18 may include a front wall 44, a rear wall 46, bottom wall 47, and side walls 48, 50. The front wall 44, rear wall 46, and side walls 48, 50 may define an interior space 52 (see FIG. 4) for storing articles. Accordingly, in some embodiments, the second container 18 may have an open top 51 in communication with the interior space 52. In such embodiments, when the apparatus 10 is in the second configuration, the third container 22 is arranged on top of the open top 51 to prevent access to the interior space 52. When the apparatus 10 is in the first configuration, the first container 12 is arranged on top of the open top 51 to prevent access to the open space 52. In some embodiments, at least a portion of the second container 18 may be movable relative to the rest of the container 18 to enable access to the interior space 52 when the apparatus 10 is in the first or second configurations, as shown in FIGS. 1 and 7. For example, the front wall 44 may be moveable (e.g., slideable, pivotable, or other movements) relative to the rest of the container 18 to permit and prevent access to the interior space 52.

Figure 25:
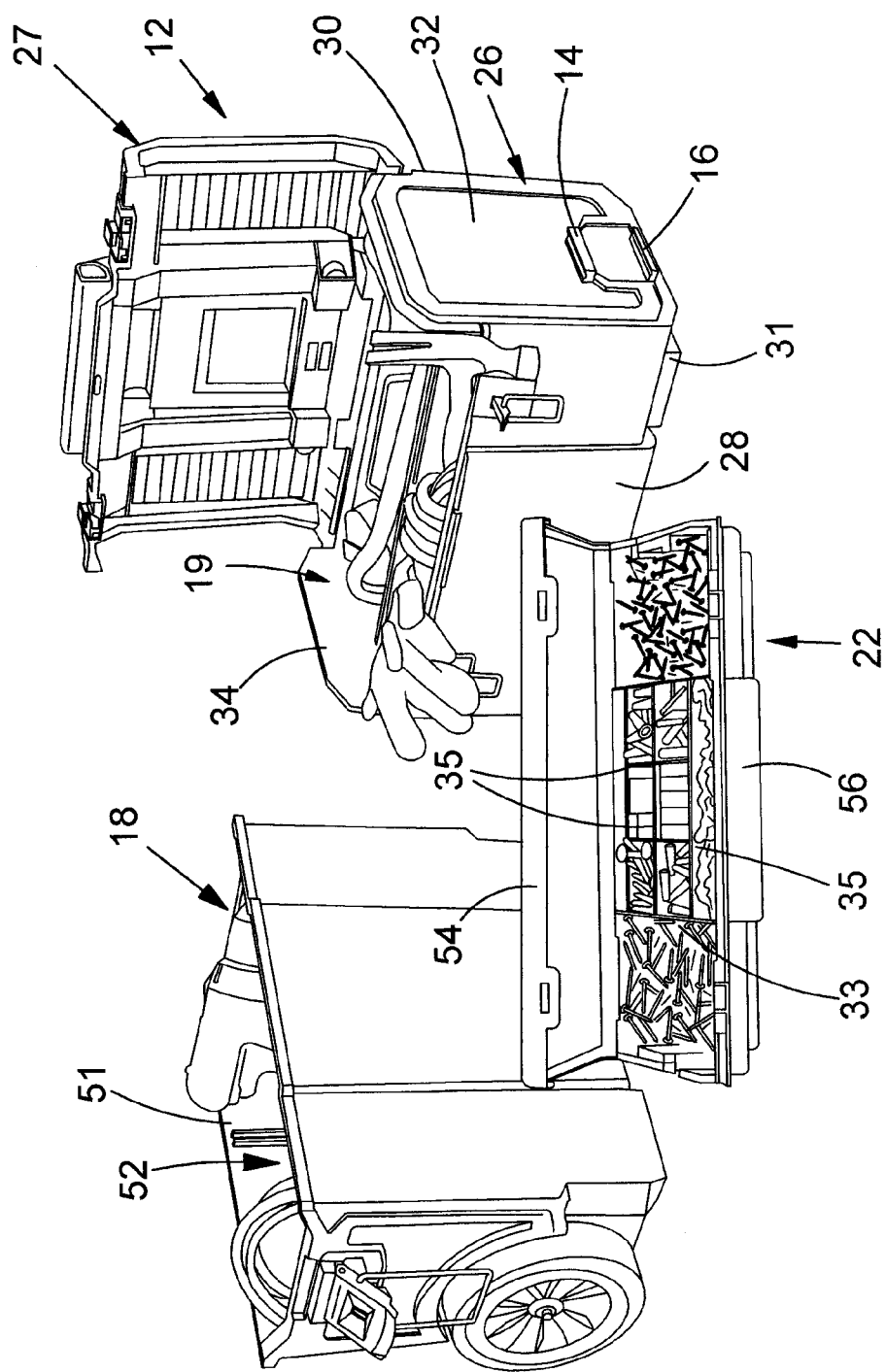
FIG. 25 is a perspective view of the first, second, and third containers unlatched and removed from one another, in accordance with an embodiment.

In one embodiment, the third container 22 is an organizer that includes a cover portion 54 and a container portion 56. The container portion 56 includes side walls 63 and 65 (see FIGS. 2 and 3). The cover portion 54 may be pivotable relative to the container portion 56 via hinges 57 (see FIG. 3) to prevent or permit access to contents stored in the container 22. Referring back to FIG. 1, latches 58 may be provided to latch the cover portion 54 to the container portion 56. The organizer 22 may include an opening 55 (see FIG. 4) that helps define a grip portion 53 (see FIG. 4) that facilitates transport of the organizer 22 separately from the apparatus 10. The third container 22 includes an interior space 33 (see FIG. 25) for storing articles. As shown in FIG. 25, in some embodiments, the interior space 33 may be divided into compartments using dividers 35. It should be appreciated that the third container 22 may have other configurations or arrangements in other embodiments.

Referring back to FIG. 1, the apparatus 10 may also include one or more rotatable ground engaging wheels 59 mounted toward the bottom of the apparatus 10 for rotation about an axis to provide rolling support of the apparatus 10. In this embodiment, the wheels 59 are mounted to the second container 18 using axle 61, which defines the axis about which the wheels 59 rotate. It should be appreciated that in some embodiments, the apparatus 10 are not provided with wheels 59.

Figure 2:
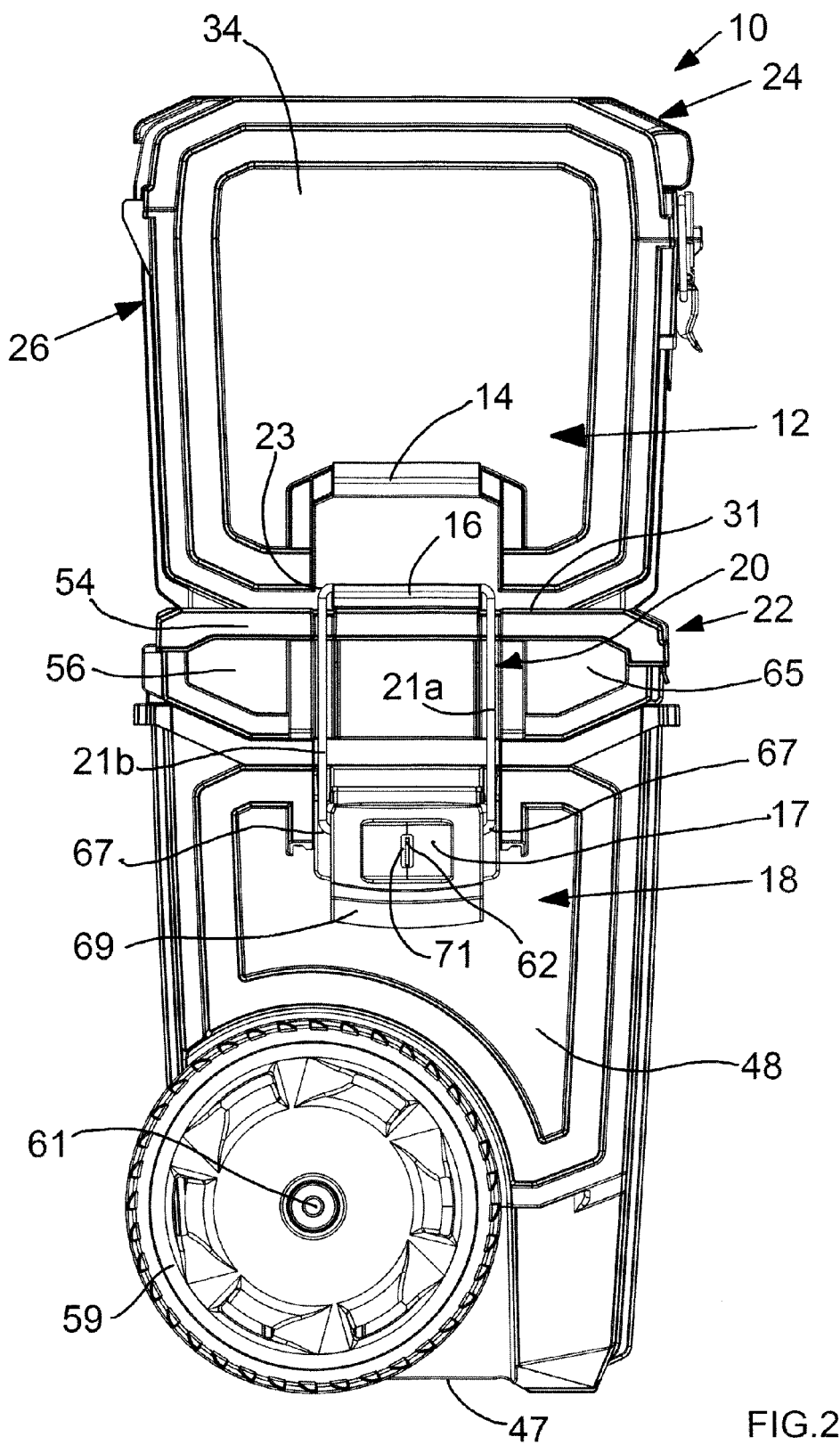
FIG. 2 is a rear pan view of the apparatus of the embodiment shown in FIG. 1.
Figure 4:
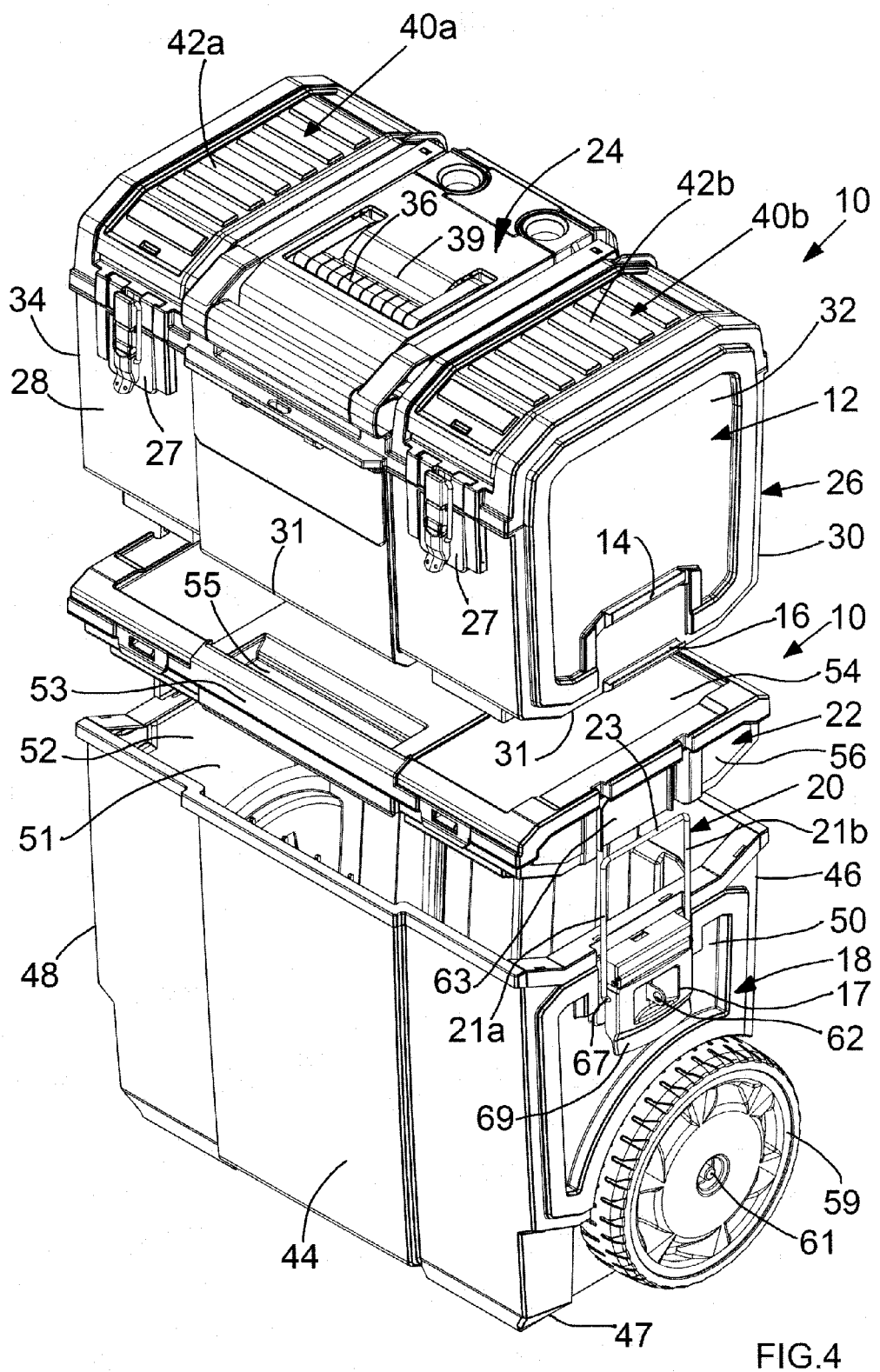
FIG. 4 is a perspective view of an apparatus having first, second, and third containers wherein the first and second containers are unlatched from one another, in accordance with an embodiment.

In the embodiment shown in FIG. 1, the latch engagement structures 14, 16 are located on the first container 12. The latch engagement structures 14, 16 may be located on the side walls 32, 34 of the first container 12 (the latch engagement structures 14, 16 of the side wall 34 are obstructed from view in FIG. 1 and are shown in FIG. 2). Accordingly, the apparatus 10 includes a pair of each of the latch engagement structures 14, 16 and a pair of latches 20. However, any number of latches 20 and latch engagement structures 14, 16 may be provided in other embodiments. In this embodiment, the pair of latches 20 are located on the side walls 48, 50 of the second container 18 (the latch 20 of the side wall 48 is obstructed from view in FIG. 1 and is shown in FIG. 2). It should be appreciated, however, that the latch 20 and the latch engagement structures 14, 16 may be interchanged. That is, the latch engagement structures 14, 16 may be located on the second container 18 and the latch 20 may be located on the first container 12. In one embodiment, the latch 20 may be a U-shaped structure made of metal material or other materials, and pivotally connected to the second container 18. The U-shaped structure includes two leg portions and a bight portion that connects the leg portions. The latch 20 may optionally be spring-biased such that the latch 20 is generally parallel to the sides 48, 50 of the second container 18, for example, as shown in FIG. 4. The latch 20 may have an upper portion 23 and two side portions 21a, 21b. In other embodiments, the latch 20 may be constructed and arranged to be slideable or releasable relative to the second container 18. In some embodiments, the latch 20 may be a snap-fit type. It should be appreciated that the configuration of the latch 20 and latch engagement structures 14, 16 may vary in other embodiments.

The latch 20 may be moveable between 1) an engaged state (see for example FIG. 1) wherein the latch 20 is engaged with the first latch engagement structure 14 or the second latch engagement structure 16 and 2) a disengaged state (see for example FIG. 25) wherein the latch 20 is disengaged from the first latch engagement structure 14 and the second latch engagement structure 16. The latch 20 may include a cover portion (or "handle") 17 that may be pivotally moved between locked and unlocked states to prevent or permit pivotal movement, respectively, of the latch 20. The cover portion 17 may be pivotally connected to the ends of the legs of U-shaped latch 20 at pivot point 67 and may include a manually engageable portion 69 constructed and arranged to be engaged to pivot the cover portion 17 between the locked and unlocked states. Movement of the cover portion 17 from the unlocked state to the locked state (e.g., by pivoting the manually engageable portion 69 downwards) will move the pivot point 67 downwards, which causes the bight portion (or cross member that connects the legs) of latch 20 to move downwards so as to engage with either the first engagement structure 14 or the second engagement structure 16. Movement of the cover portion 17 from the locked state to the unlocked state (e.g., by pivotally lifting the engaging portion 69 upward) will move the pivot point 67 upwards, which causes the bight portion of latch 20 to move upwards so as to be lifted and released from the first engagement structure 14 or the second engagement structure 16. A lock receiving structure 62 may be provided on the second container 18 and may be constructed and arranged to facilitate locking the cover portion 17 in the locked state so as to prevent the latch 20 from being moved between the engaged and disengaged states. The lock receiving structure 62 may be connected to the second container 18 and may extend through an opening 71 formed in the cover portion 17. An opening 73 may be formed in the lock receiving structure 62 and may be constructed and arranged to receive a padlock or other types of locks to lock the cover portion 17 in the locked state. Accordingly, when a portion of a padlock or other types of lock is received in the opening 73 of the lock receiving structure 62, the cover latch 17 is prevented from being lifted upwards to the unlocked state using the engaging portion 69.

In the embodiment of FIG. 1, the first container 12 is arranged on top of the third container 22, which is arranged on top of the second container 18, and the first and second containers 12, 18 are latched together with the third container 22 therebetween. Accordingly, the third container 22 is disposed directly on top of the open top 51 of the second container 18 to prevent access to the interior space 52 of the second container 18. Thus, in some embodiments, to permit access to the contents of the interior space 52 of the second container 18, the first container 12 should be unlatched from the second container 18, and then the first container 12 and the third container 22 may be removed from the second container 18.

Figure 5:
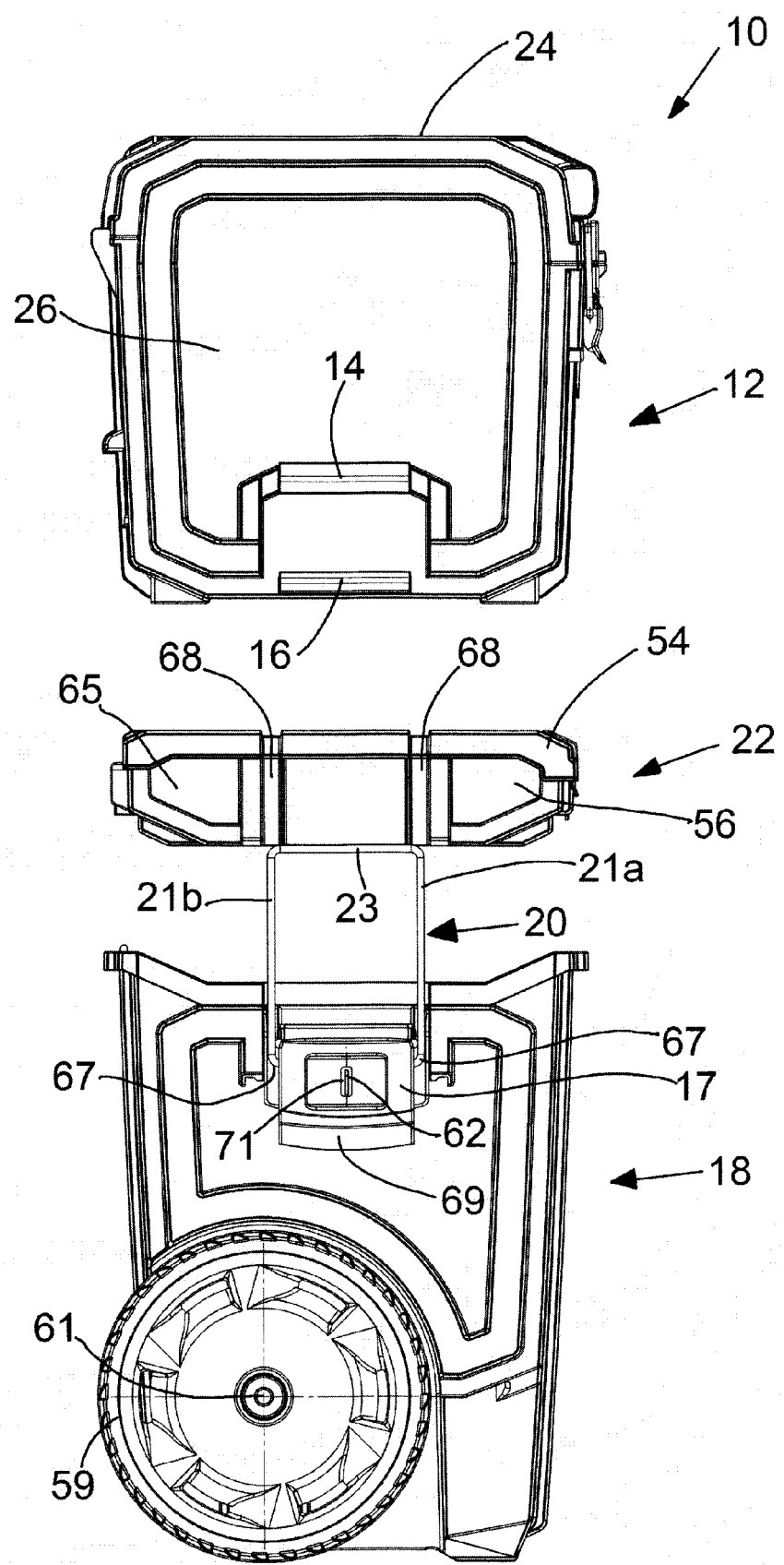
FIG. 5 is a side view of the apparatus of the embodiment shown in FIG. 4.
Figure 6:
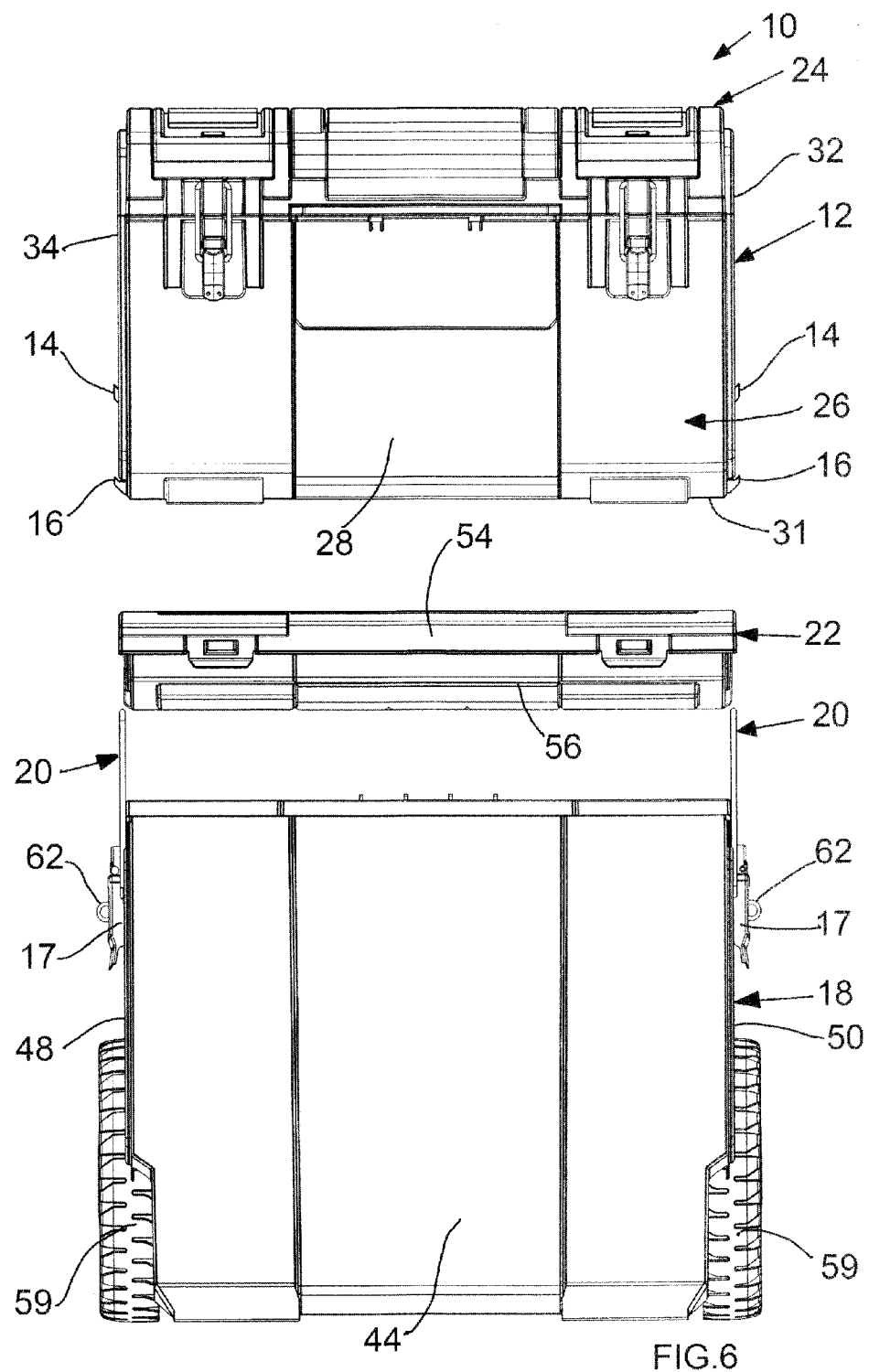
FIG. 6 is a rear pan view of the apparatus of the embodiment shown in FIG. 6.

FIGS. 4, 5, and 6 show the apparatus 10 having the first container 12, the second container 18, and the third container 22, and with the containers 12, 18, 22 unlatched from one another. As shown in FIG. 5, the third container 22 includes grooves 68 provided on the sides 63, 65 (the grooves 68 on the side 63 is obstructed from view in FIG. 5). The grooves 68 are constructed and arranged to receive portions of the latch 20, such as the side portions 21a and 21b, when the second container 18 is latched to the first container 12 with the third container 22 provided therebetween.

Figure 8:
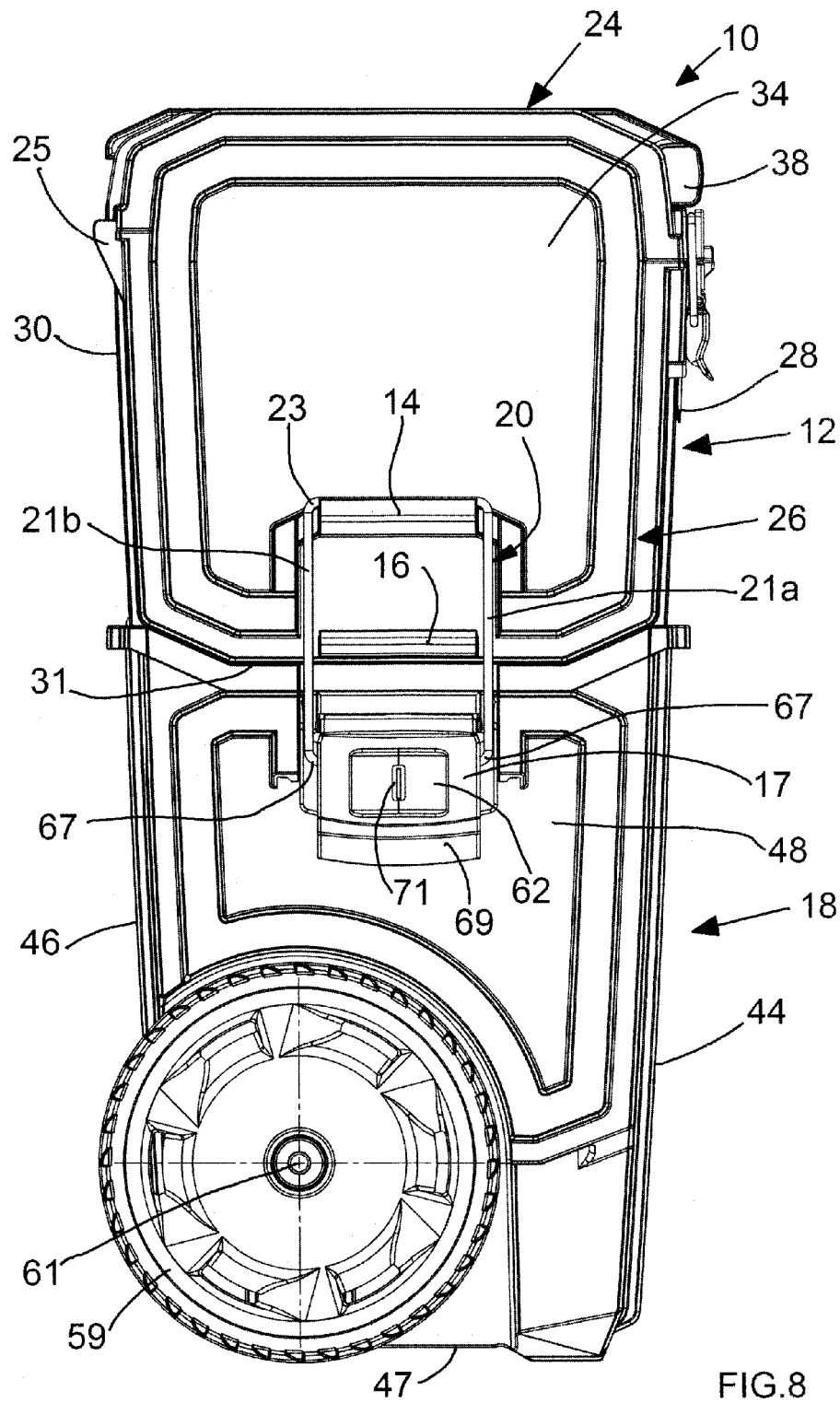
FIG. 8 is a side view of the apparatus of the embodiment shown in FIG. 7.
Figure 9:
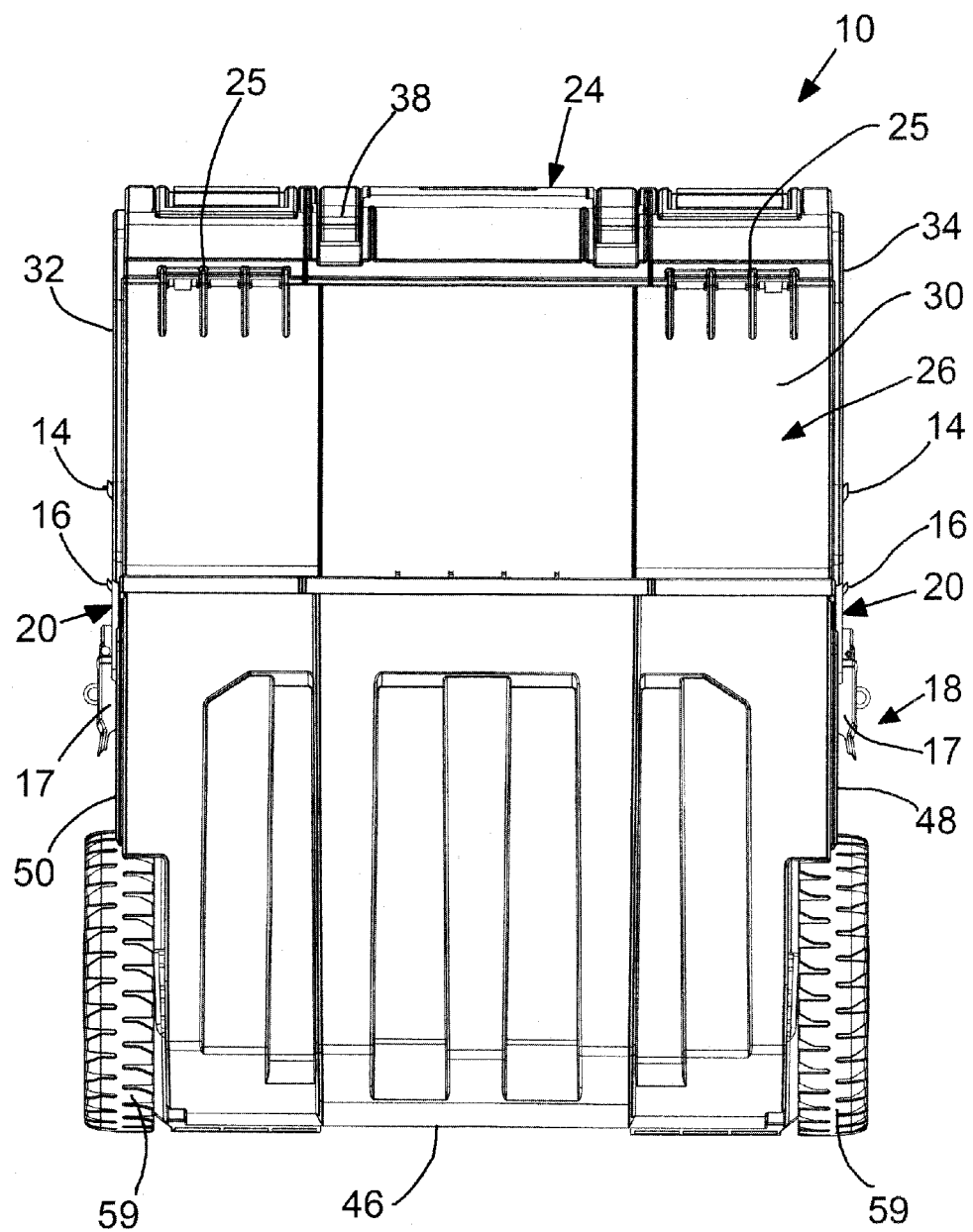
FIG. 9 is a rear pan view of the apparatus of the embodiment shown in FIG. 7.

FIG. 7 shows the apparatus 10 in the first configuration wherein the first container 12 is arranged directly on top of the second container 18. In this embodiment and configuration, the latch 20 is provided on the second container 18 and is engaged with the first engagement structure 14 provided on the first container 12. In this embodiment, the first container 12 is disposed directly on top of the open top 51 of the second container 18 to prevent access to the second container 18. Thus, in some embodiments, to permit access to the contents of the interior space 52 of the second container 18, the first container 12 should be unlatched and removed from the second container 18. The configuration of the first container 12 in the embodiment shown in FIG. 2 may be similar to the configuration of the first container 12 in the embodiment shown in FIG. 1. Similarly, the configuration of the second container 18 in the embodiment shown in FIG. 2 may be similar to the configuration of the second container 18 in the embodiment shown in FIG. 1. However, in this embodiment, the apparatus 10 is in the first configuration and there is no third container provided between the first and second containers 12, 18. FIG. 8 shows a side view of the apparatus 10 having the first configuration and FIG. 9 shows a rear view of the apparatus 10 having the first configuration.

Figure 10:
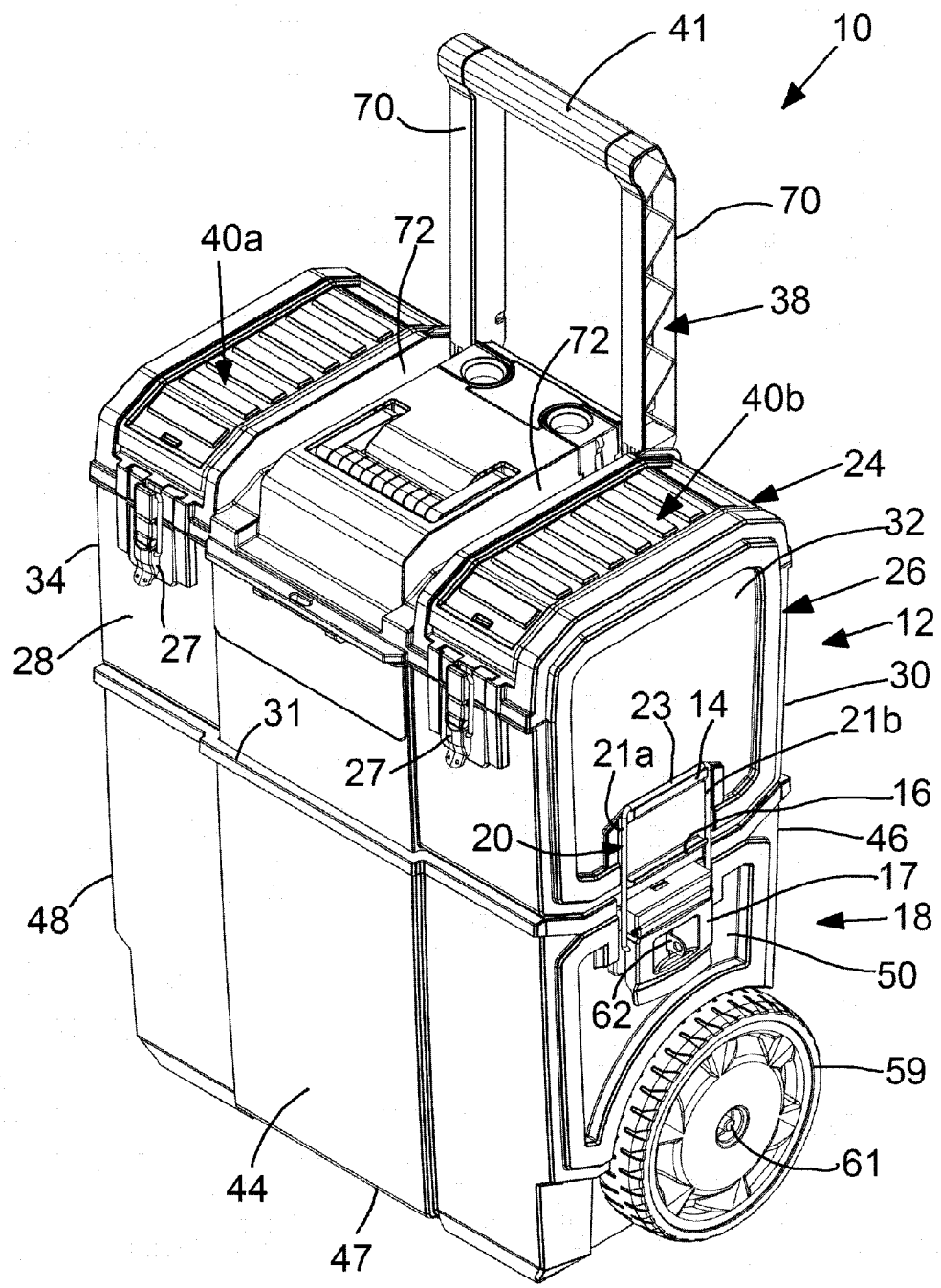
FIG. 10 is a perspective view of another embodiment of the apparatus having the first and second containers in the first configuration.
Figure 11:
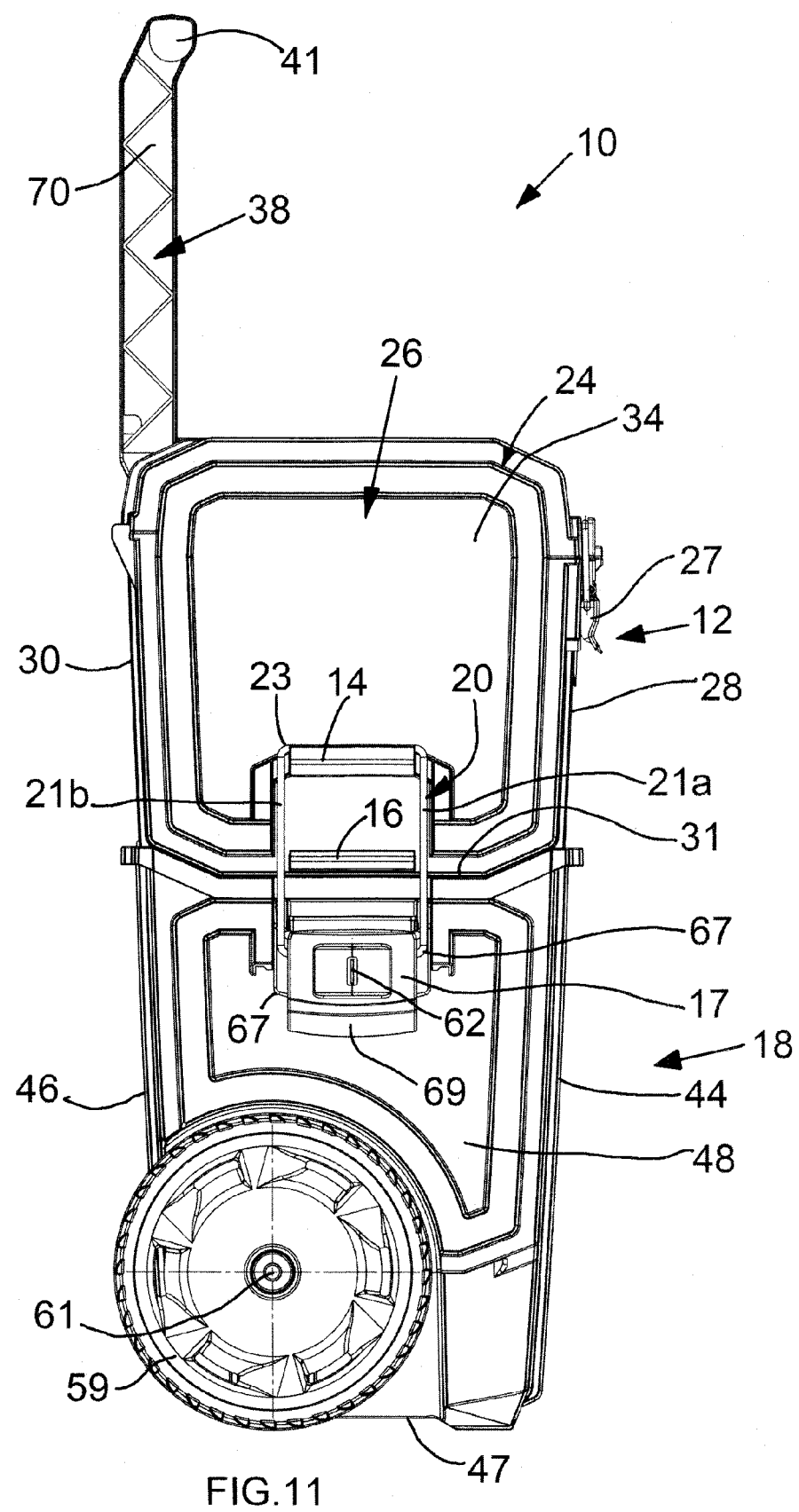
FIG. 11 is a side view of the apparatus of the embodiment shown in FIG. 10.
Figure 12:
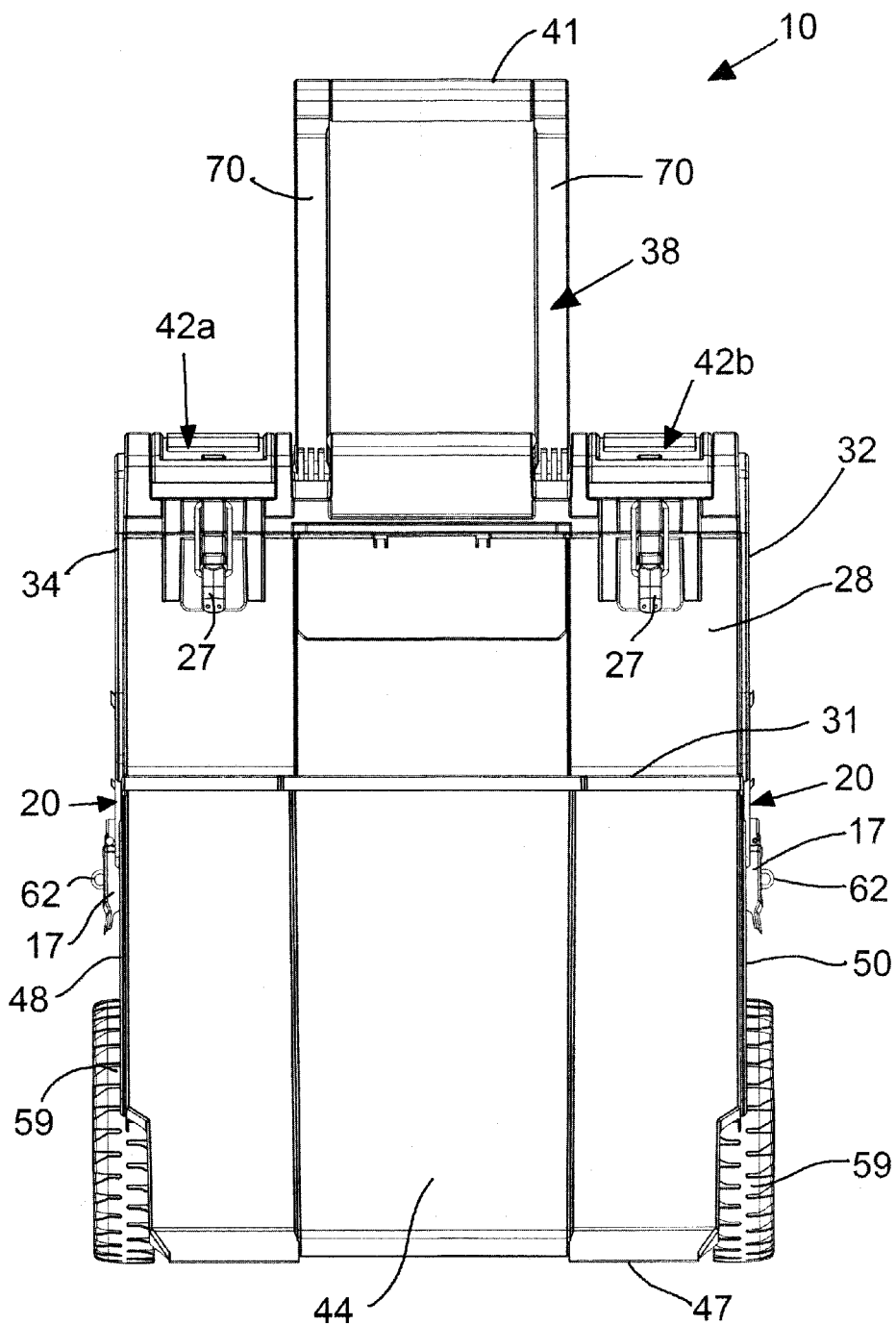
FIG. 12 is a front pan view of the apparatus of the embodiment shown in FIG. 12.

FIG. 10 shows another embodiment of the apparatus 10 in the first configuration, having a first container 12 with a non-extendible apparatus handle 38. The handle 38 includes side portions 70 connected together by the grip portion 41. The side portions 70 are constructed and arranged to be received in grooves 72 formed in the top portion 24 of the container 12 when the handle 38 is in a retracted, stored position. The handle 38 is constructed and arranged to be pivotable to move it to the upright position shown in FIG. 10 to facilitate rolling movement of the apparatus 10. FIG. 11 shows a side view of the embodiment shown in FIG. 10. FIG. 12 shows a front pan view of the embodiment shown in FIG. 10. It should be appreciated that the embodiment of the first container 10 shown in FIG. 10 may be arranged with a third container 22 between the first and second containers 12, 18 to define the second configuration. Accordingly, although this embodiment shows the first configuration, it should be appreciated that the second configuration may also exist using this embodiment of the first container 12.

Figure 13:
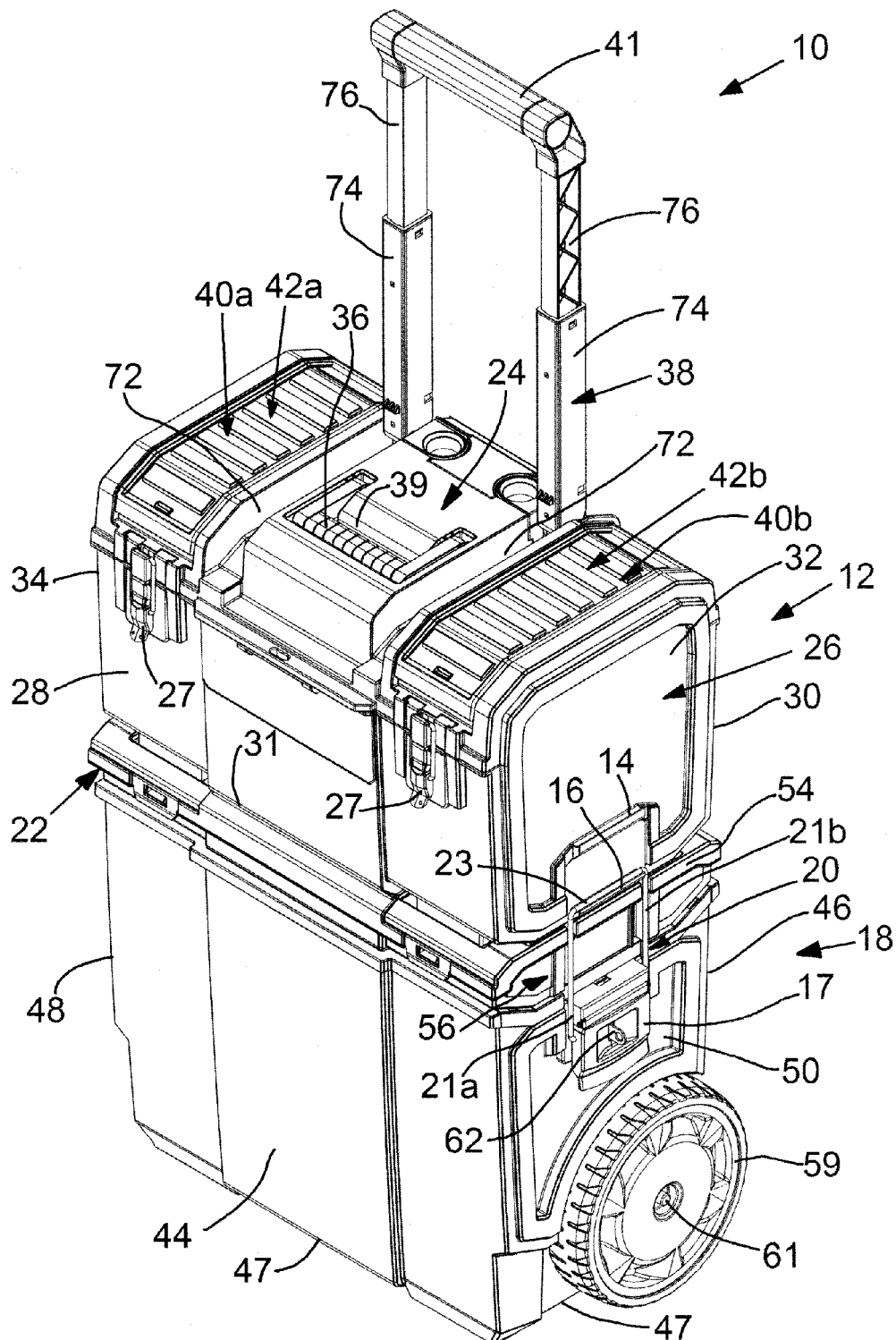
FIG. 13 is a perspective view of yet another embodiment of the apparatus having the first and second containers in the second configuration with a third container provided therebetween.
Figure 14:
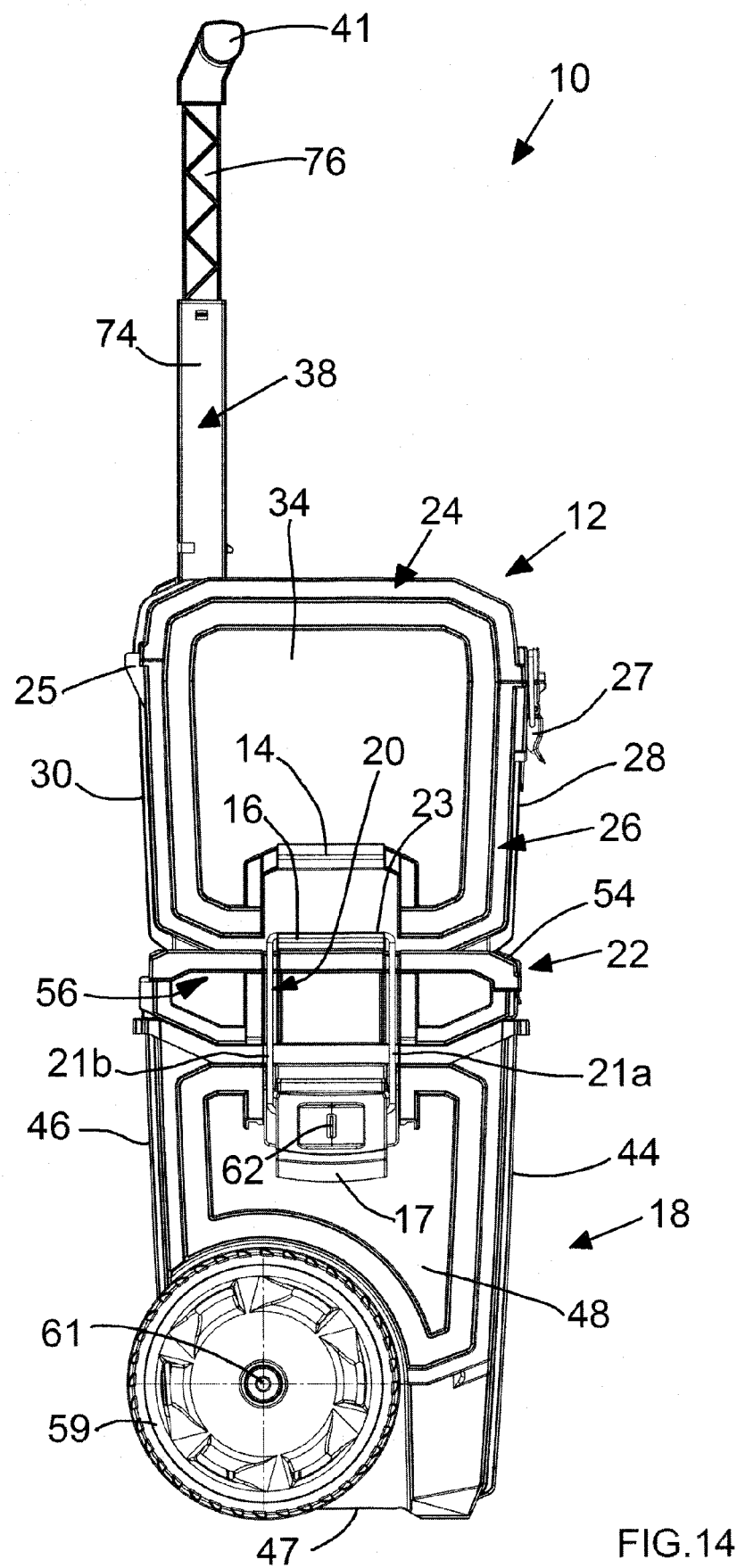
FIG. 14 is a side view of the apparatus of the embodiment shown in FIG. 13.
Figure 15:
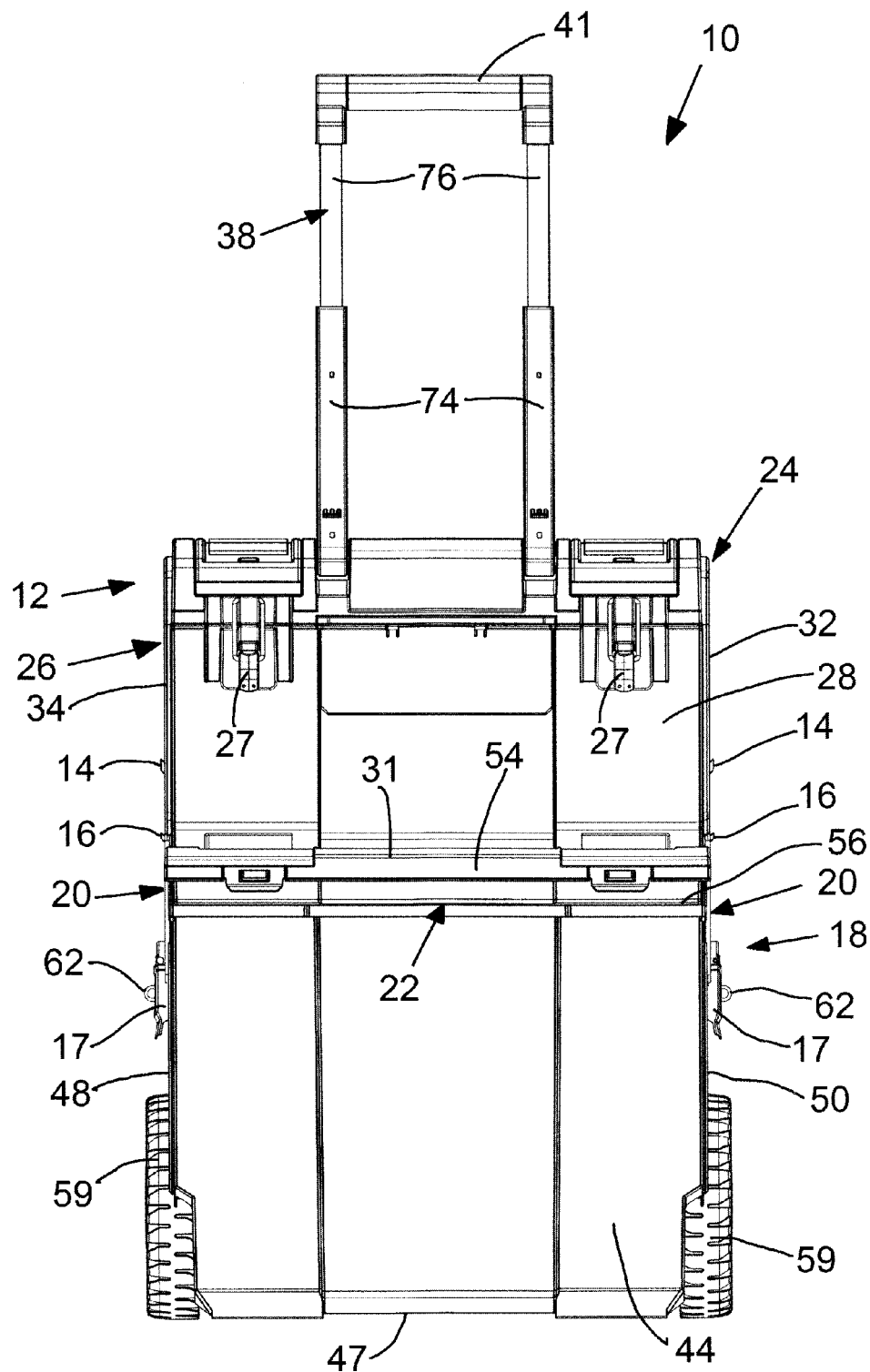
FIG. 15 is a front pan view of the apparatus of the embodiment shown in FIG. 13.

FIG. 13 shows yet another embodiment of the apparatus 10 in the second configuration, having a first container 12 with an extendible, telescopic apparatus handle 38. In this Figure, the handle 38 is shown in an upright position to facilitate rolling transport of the apparatus 10. In this embodiment, the handle 38 includes base portions 74 and extendible portions 76. The extendible portions 76 are constructed and arranged to be received and movable within the base portions 74. The pair of extendible portions 76 are connected to each other via the grip portion 41. The handle 38 may be moved to the storage position by retracting the handle 38 by pushing extendible portions 76 into the base portions 74 and then pivoting the handle 38 from the upright position shown in FIG. 13 to the storage position wherein the base portions 74 are received in the grooves 72 formed in the top portion 24 of the container 12. In this embodiment, the apparatus 10 is shown with the first and second containers 12, 18 latched together with a third container 22 therebetween. It should be appreciated that the embodiment of the first container 12 shown in FIG. 13 may also be latched to the second container 18 in the first configuration. FIG. 14 shows a side view of the embodiment of the apparatus 10 shown in FIG. 13, and FIG. 15 shows a front pan view of the embodiment of the apparatus 10 shown in FIG. 13.

Figure 16:
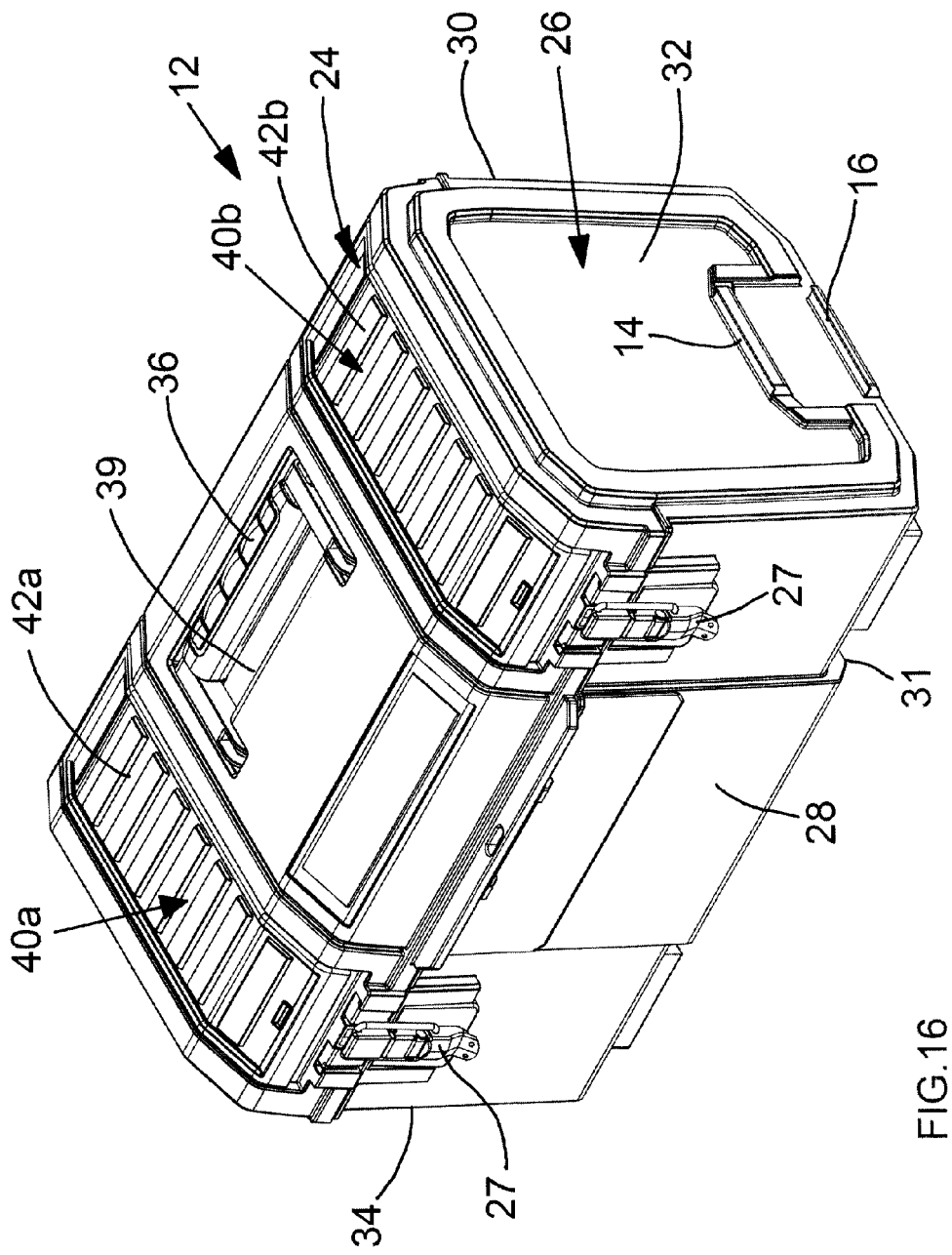
FIG. 16 is a perspective view of the first container in accordance with an embodiment.

FIG. 16 shows yet another embodiment of the first container 12. In this embodiment, the first container 12 is not provided with the apparatus handle 38 but includes the first handle 36 that may be used to facilitate transport of the first container 12. The first handle 36 is pivotable between a stored position wherein the handle 36 is received within the recess 39 formed in the cover portion 24 and an upright position (not shown) that facilitates transport of the first container 12. This embodiment of the first container 12 includes many similar components of the embodiment of the first container 12 shown in FIG. 1, except the inclusion of the apparatus handle 38 in FIG. 1. For example, the first container 12 includes the storage portions 42a, 42b formed in the cover portion 24 of the container 12.

Figure 17:
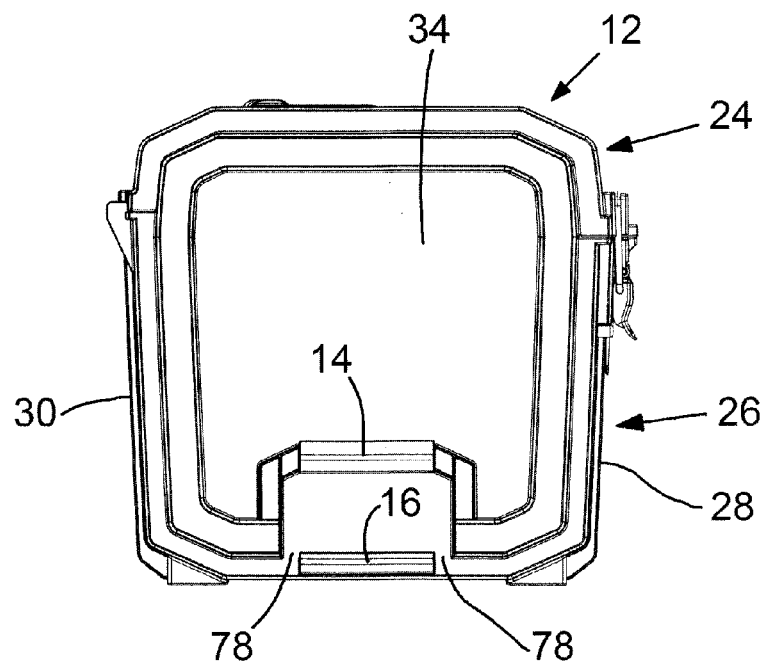
FIG. 17 is a side view of the first container of the embodiment shown in FIG. 16.
Figure 18:
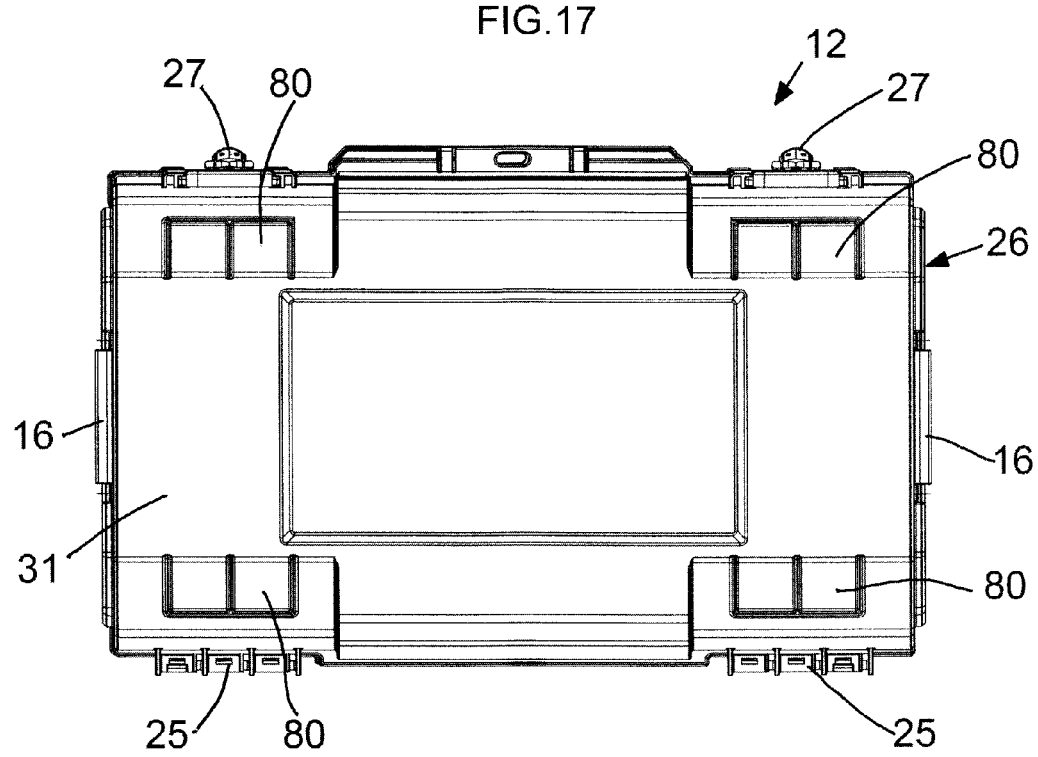
FIG. 18 is a bottom view of the first container of the embodiment shown in FIG. 16.

FIG. 17 shows a side view of the embodiment of the first container 12 shown in FIG. 16. FIG. 18 shows a bottom view of the embodiment of the first container 12 shown in FIG. 16. In this embodiment, the first container 12 includes feet 80 provided on the bottom wall 31 to facilitate resting the first container 12 on a surface or on another container. In some embodiments, the feet 80 may be provided with rubber material or other friction providing material to help prevent slipping of the container 12 when resting on the surface or on another container.

Figure 19:
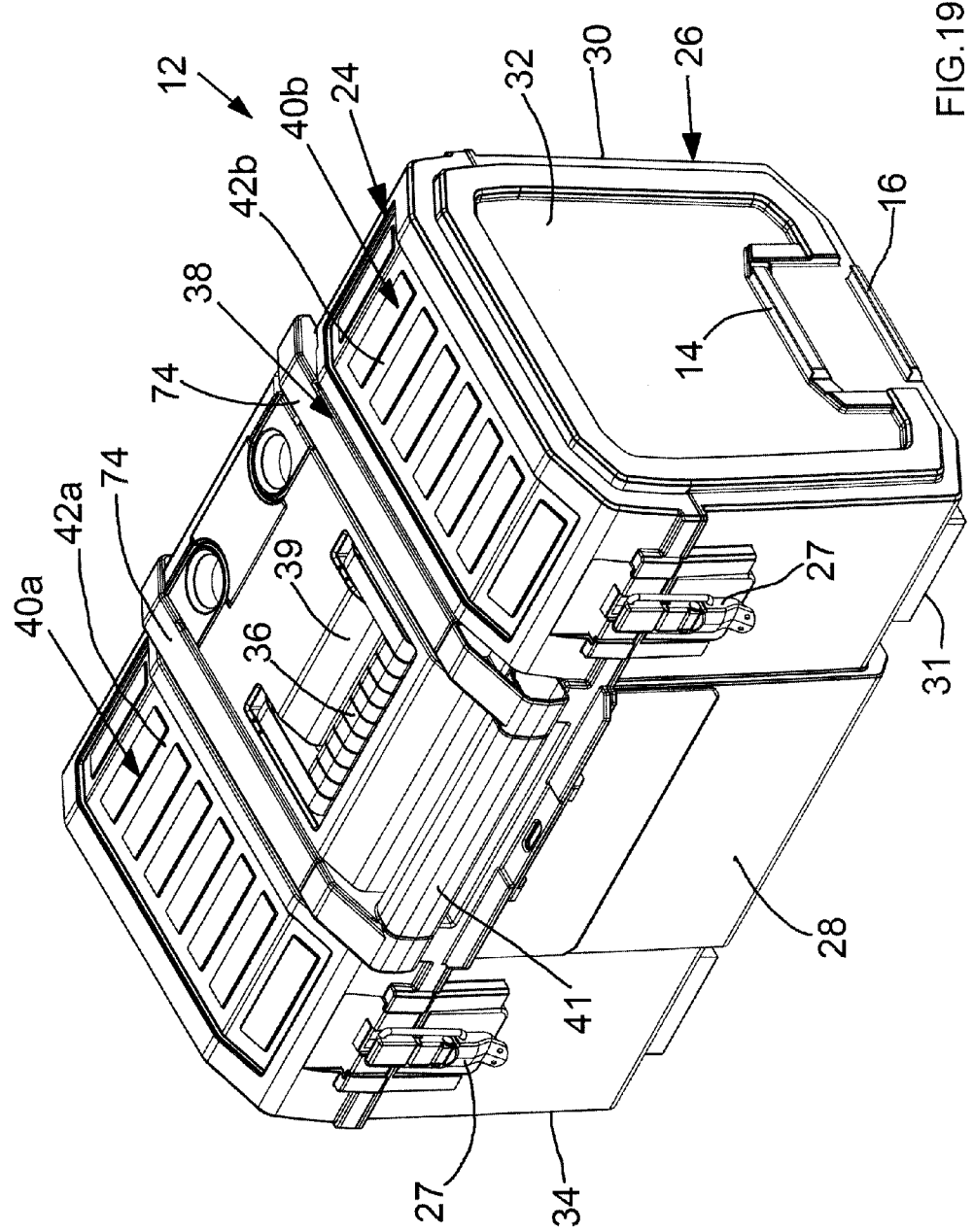
FIG. 19 is a perspective view of another embodiment of the first container.
Figure 20:
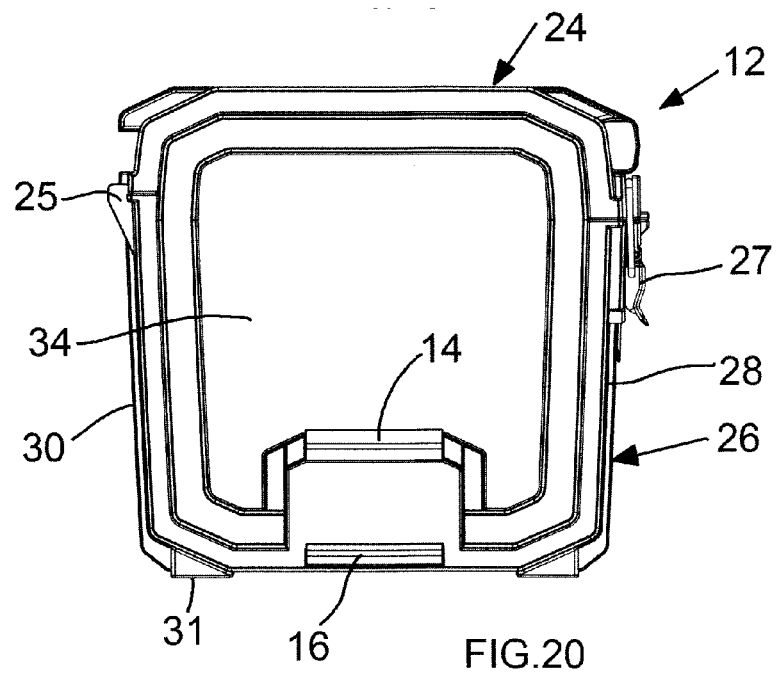
FIG. 20 is a side view of the first container of the embodiment shown in FIG. 19.
Figure 21:
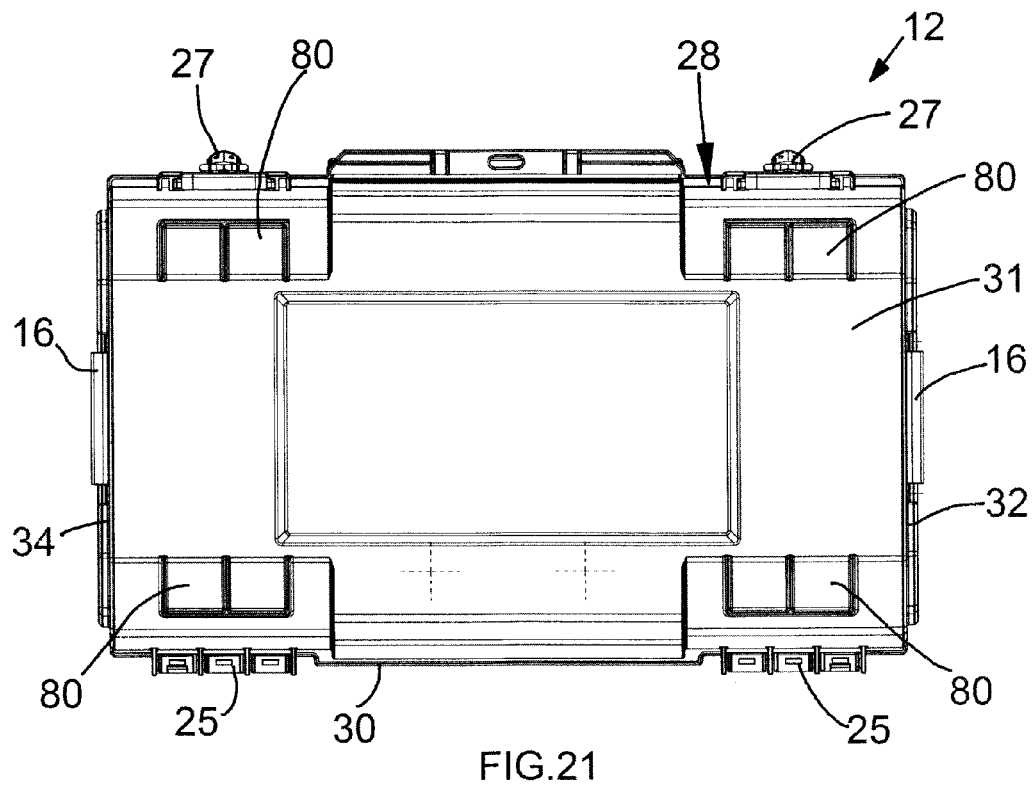
FIG. 21 is a bottom view of the first container of the embodiment shown in FIG. 19.

FIG. 19 shows yet another embodiment of the first container 12 with the handle 38. In this embodiment, the handle 38 is extendible or telescopic. Accordingly, the handle 38 is in the stored position in contrast to the extended position shown in FIG. 13. FIG. 20 shows a side view of the embodiment of the first container 12 of FIG. 19, and FIG. 21 shows a bottom view of the embodiment of the first container 12 of FIG. 19.

Figure 22:
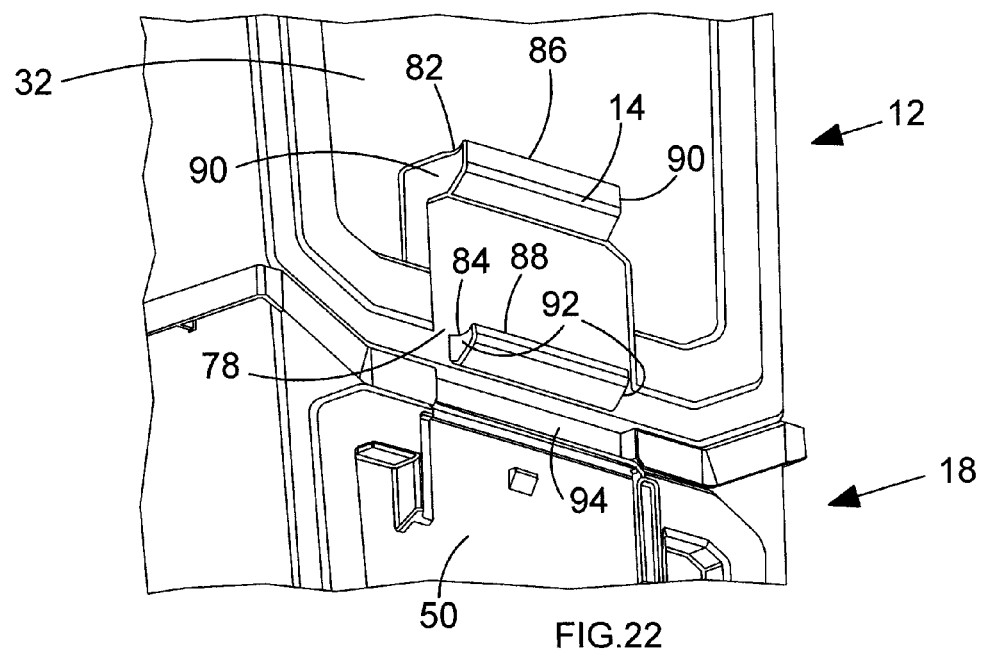
FIG. 22 is a detailed view of a portion of the first and second containers, with a latch, removed to better show details of a first latch engagement structure and a second latch engagement structure, in accordance with an embodiment.

FIG. 22 shows a detailed view of the first and second latch engagement structures 14, 16. The first and second latch engagement structures 14, 16 on the various embodiments of the first container 12 may have similar construction and arrangements. Alternatively, it should be appreciated that the first and second latch engagement structures 14, 16 on the various embodiments of the first container 12 may have different construction and arrangements.

As shown in FIG. 22, the first and second latch engagement structures 14, 16 are extended structures that protrude from the side wall 32 of the container. In this embodiment, the first and second latch engagement structures 14, 16 are vertically spaced from each other. The first and second latch engagement structures may include arcuate surfaces 82, 84, respectively, constructed and arranged to receive the upper portion 23 of the latch 20 (not shown in this Figure) when the latch 20 and the first or second latch engagement structures 14, 16 are engaged. A lip 86, 88 may be provided on each of the first and second latch engagement structures 14, 16, respectively, to help retain the latch 20 when the latch 20 is received by the arcuate surfaces 82, 84. In this embodiment, the side portions 21a, 21b of the latch 20 may be received in spaces 78 when the latch 20 is engaged to the first latch engagement structure 14. The latch 20 may optionally abut against sides 90 of the first latch engagement structure 14 and/or against sides 92 of the second latch engagement structure 16 when the latch 20 is engaged with the first latch engagement structure 14. Additionally, the latch 20 may optionally abut against sides 92 of the second latch engagement structure 16 when the latch 20 is engaged with the second latch engagement structure 16. The side wall 50 of the second container 18 may include a recessed cutout 94 constructed and arranged to allow the side portions 21a, 21b of the latch 20 to extend upwards towards the first and second latch engagement structures 14, 16.

Figure 23:
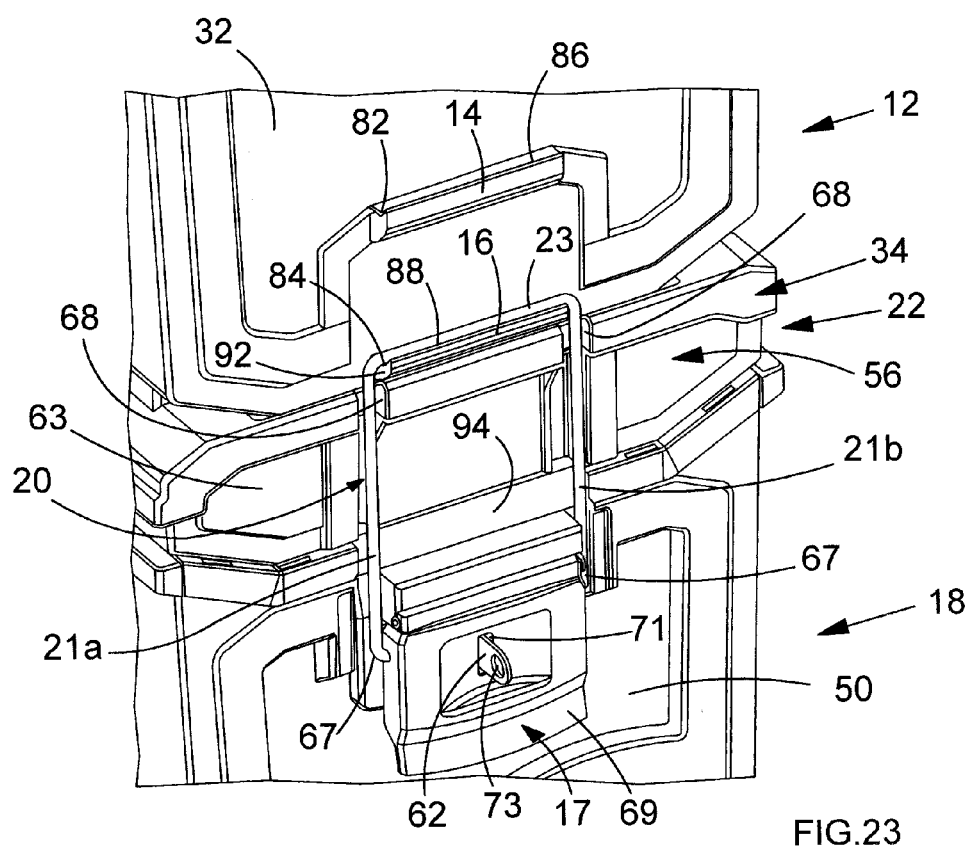
FIG. 23 is a detailed view of portions of the first and second containers in the second configuration with the third container provided therebetween and the latch engaged with the second latch engagement structure, in accordance with an embodiment.

The latch 20 may be engaged with the second latch engagement structure 16 and with the third container 22 located between the first container 12 and the second container 18 in the second configuration, for example, as shown in FIG. 23. In this embodiment, the side portions 21a, 21b extend through the recessed cutout 94 formed in the second container 18 and are received in the grooves 68 formed on the side 63 of the third container 22. The upper portion 23 of the latch 20 is disposed on the arcuate surface 84 of the second latch engagement structure 16 and is retained in that position by the lip 88 of the second latch engagement structure 16. A portion of the latch 20 may abut against the sides 92 of the second latch engagement structure 16. Accordingly, the first and second containers 12, 18 are latched together in the second configuration with the third container 22 located therebetween. The arrangement also prevents movement of the third container 22. For example, the latch 20 is received within grooves 68 of the third container 22, which prevents the third container 22 from being removed from between the first and second containers 12, 18.

Figure 24:
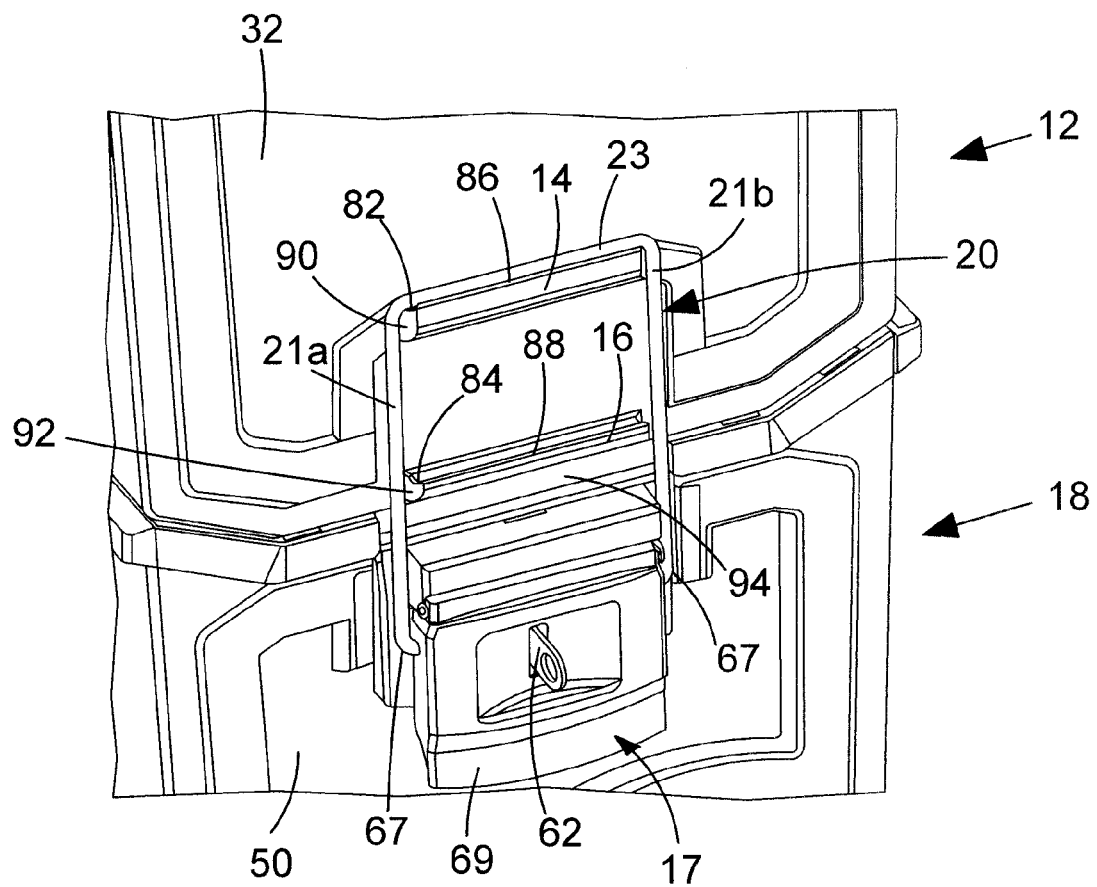
FIG. 24 is a detailed view of portions of the first and second containers in the first configuration and the latch engaged with the first latch engagement structure, in accordance with an embodiment.

The latch 20 may also be engaged with the first latch engagement structure 14 in the first configuration, for example, as shown in FIG. 24. In this embodiment, the side portions 21a, 21b of the latch 20 extend through the recessed cutout 94 formed in the second container 18. The upper portion 23 of the latch 20 is disposed on the arcuate surface 82 of the first latch engagement structure 14 and is retained in that position by the lip 86 of the first latch engagement structure 14. A portion of the latch 20 may abut against the sides 90 of the first latch engagement structure 14 and the sides 92 of the second latch engagement structure 16. Accordingly, the first and second containers 12, 18 are latched together in the first configuration.

The apparatus 10 having the second configuration may be latched as follows. Although only one of the latches 20 is described, it should be appreciated that the other latch of the pair of latches 20 (in embodiments having a pair of latches), may be operated in a similar manner. The apparatus 10 may initially be in the position shown in FIG. 4 wherein the third container 22 and the first container 12 are removed from the second container 18.

Figure 26:
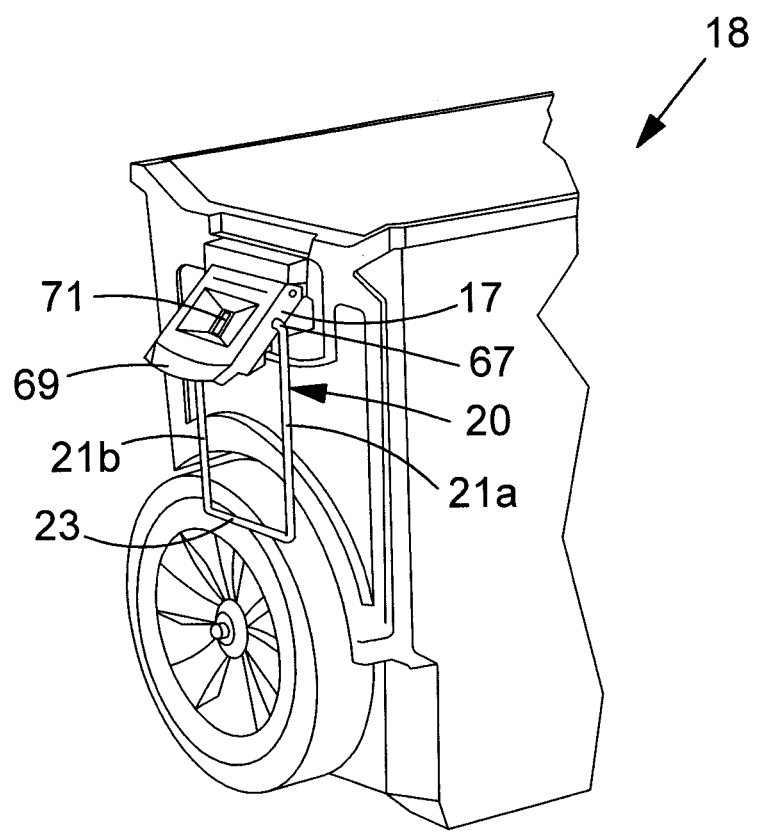
FIG. 26 is a detailed view of a portion of the second container with the latch in an unlocked state.

In embodiments where the latch 20 is manual and is not spring biased, the latch 20 may have a clamp like configuration. In such embodiments, the latch 20 may initially be positioned such that the upper portion 23 is closer than the side portions 21a, 21b of the latch 20 to the bottom wall 47 of the second container 18, for example as shown in FIGS. 25 and 26. That is, the upper portion 23 and the side portions 21a, 21b may form a U-shaped configuration. This may be the unlocked and disengaged state of the latch 20 wherein the latch 20 is movable. The third container 22 may be placed on top of the second container 18 and the first container 12 may be placed on top of the third container 22. The latch 20 may then be pivoted from the position shown in FIG. 25 upwards and in a clockwise direction such that the side portions 21*a*, 21*b* are located closer than the upper portion 23 to the bottom wall 47 of the container 18. The cover portion 17 may then be pushed downwards such that the latch 20 is "clamped" onto the second latch engagement structure 16. That is, the cover portion 17 may be pivoted downwards using the engagement portion 69 of the cover latch 17, which causes the pivot point 67 to move downwards. As a result, the latch 20 is also moved downwards such that the latch 20 "clamps" onto the second latch engagement structure 16. That is, the latch 20 may be in the upright position wherein the upper portion 23 and the side portions 21*a*, 21*b* form an upside down U-shaped configuration. Accordingly, the side portions 21*a*, 21*b* of the latch may be received in the grooves 68 of the third container 22, and the upper portion 23 may be pulled onto the arcuate surface 84 of the second latch engagement structure 16 and retained in that position by the lip 88 of the second latch engagement structure 16, as shown in FIG. 23.

Alternatively, in embodiments where the latch 20 is spring biased, the latch 20 may initially be in the upright position wherein the upper portion 23 and the side portions 21*a*, 21*b* form an upside down U-shaped configuration (see for example 4). The latch 20 may be rotated in the clockwise direction against the bias of the spring to accommodate the placement of the third container 22 on top of the second container 18, and then be moved back into place by the bias of the spring such that the side portions 21*a*, 21*b* of the latch 20 are received within the grooves 68 of the third container 22. The first container 12 may then be placed on top of the third container 22. In embodiments where the latch 20 is spring biased, and during such placement, the lip 88 of the second latch engagement structure 16 may contact and push against the upper portion 23 of the latch 20 until the first container 12 is placed directly on top of the third container 22, whereupon the upper portion 23 of the latch 20 may snap onto the arcuate surface 84 of the second latch engagement structure 16 and be retained in that position by the lip 88, for example, as shown in FIG. 23.

The apparatus 10 having the second configuration may be unlatched as follows. Although only one of the latches 20 is described, it should be appreciated that the other latch of the pair of latches 20 (in embodiments having a pair of latches), may be operated in a similar manner. The apparatus 10 may initially be in the position shown in FIG. 23. In embodiments having the manual latch with a "clamp-like" configuration, the latch cover 17 may be pulled upwards using the engagement portion 69 to move the latch cover 17 to its unlocked position. As a result, the pivot point 67 is also moved upwards, which permits the latch 20 to be lifted and disengaged from the second engagement structure 16. Accordingly, the upper portion 23 of the latch 20 is removed from its contact with the arcuate surface 84 of the second latch engagement structure 16. The latch 20 may then be pivoted in the clockwise direction in FIG. 23 and moved to the disengaged position.

In some embodiments where the latch is spring-biased, sufficient force may be needed to push against and overcome the lip 88 that is constructed and arranged to retain the upper portion 23 of the latch 20 on the arcuate surface 84 and the bias of the spring. After the upper portion 23 of the latch 20 has been removed from the arcuate surface 84 and away from the lip 88, the first container 12 may then be lifted from the third container 22 and the third container 22 may then be lifted away from the second container 18.

The apparatus 10 having the first configuration may be latched in a similar manner as above. The first container 12 may be placed onto the second container 18. In embodiments where the latch 20 is manual and is not spring biased, the latch 20 may have a clamp like configuration. In such embodiments, the latch 20 may initially be positioned such that the upper portion 23 is closer than the side portions 21*a*, 21*b* of the latch 20 to the bottom wall 47 of the second container 18, for example as shown in FIG. 25. This may be the unlocked or disengaged state of the latch 20 wherein the latch 20 is movable. The first container 12 may be placed on top of the second container 18. The latch 20 may then be pivoted from the position shown in FIG. 25 upwards and in a clockwise direction in FIGS. 25 and 26 such that the side portions 21*a*, 21*b* are located closer than the upper portion 23 to the bottom wall 47 of the container 18. The cover portion 17 may then be pushed downwards such that the latch 20 is "clamped" onto the first latch engagement structure 14. That is, the cover portion 17 may be pivoted downwards using the engagement portion 69 of the cover latch 17, which causes the pivot point 67 to move downwards. As a result, the latch 20 is also moved downwards such that the latch 20 "clamps" onto the first latch engagement structure 14. Accordingly, the upper portion 23 may be pulled onto the arcuate surface 82 of the first latch engagement structure 14 and retained in that position by the lip 86 of the first latch engagement structure 14, as shown in FIG. 24. As such, the cover portion 17 is in the locked position wherein movement of the latch 20 between the disengaged and engaged positions is prevented.

Alternatively, in embodiments where the latch 20 is spring biased, and during placement of the first container 12 on the second container 18, the lip 86 of the first latch engagement structure 14 may contact and push against the upper portion 23 of the latch 20 until the first container 12 is placed directly on top of the second container 18, whereupon the upper portion 23 of the latch 20 may snap onto the arcuate surface 82 of the second latch engagement structure 16 and be retained in that position by the lip 86, for example, as shown in FIG. 24.

The apparatus 10 having the first configuration may be unlatched as follows. Although only one of the latches 20 is described, it should be appreciated that the other latch of the pair of latches 20 (in embodiments having a pair of latches), may be operated in a similar manner. The apparatus 10 may initially be in the position shown in FIG. 24. In embodiments having the manual latch with a "clamp-like" configuration, the latch cover 17 may be pulled upwards using the engagement portion 69 to move the latch cover 17 to its unlocked position. As a result, the pivot point 67 is also moved upwards, which permits the latch 20 to be lifted and disengaged from the first engagement structure 14. Accordingly, the upper portion 23 of the latch 20 is from its contact with the arcuate surface 82 of the first latch engagement structure 14. The latch 20 may then be pivoted in the clockwise direction in FIG. 24 and moved to the disengaged position.

In some embodiments where the latch is spring-biased, sufficient force may be needed to push against and overcome the lip 86 that is constructed and arranged to retain the upper portion 23 of the latch 20 on the arcuate surface 82 and the bias of the spring. After the upper portion 23 of the latch 20 has been removed from the arcuate surface 82 and away from the lip 86, the first container 12 may then be lifted the second container 18.

It should be appreciated that the latch 20 is not limited to the embodiments described above, and may have other configurations or arrangements in other embodiments. In addition, as mentioned above, it should be appreciated that the rolling container assembly 10 may include any number of containers that are releasably connected together using latches. The containers may have a variety of configurations, and the apparatus may include any combination of storage containers, container tops, base storage containers, and top storage containers.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment may be combined with one or more features of any other embodiment.

The invention claimed is:

1. An apparatus for transporting articles between working locations, comprising:
    a first container comprising a first latch engagement structure and a second latch engagement structure;
    a second container comprising a latch, wherein the latch is constructed and arranged to selectively engage with 1) the first latch engagement structure of the first container to latch the first and second containers in a first configuration or 2) the second latch engagement structure of the first container to latch the first and second containers in a second configuration;
    a third container configured to selectively separate the first and second containers,
    wherein in the first configuration, one of the first and second containers is arranged on top of the other of the first and second containers without the third container therebetween,
    wherein in the second configuration, the third container is provided between the first and second containers, separating the first and second containers; and
    wherein each of the first container and the second container comprise a bottom wall therein.

2. The apparatus of claim 1, wherein the first latch engagement structure is vertically displaced from the second latch engagement structure.

3. The apparatus of claim 1, wherein the latch is moveable between 1) an engaged state wherein the latch is engaged with the first latch engagement structure or the second latch engagement structure and 2) a disengaged state wherein the latch is disengaged from the first latch engagement structure and the second latch engagement structure.

4. The apparatus of claim 3, further comprising a latch lock constructed and arranged to lock the latch so as to prevent pivotal movement of the latch between the engaged and disengaged states.

5. The apparatus of claim 1, wherein the third container is an organizer.

6. The apparatus of claim 1, wherein the first container is a toolbox.

7. The apparatus of claim 6, wherein the toolbox comprises a telescopic handle.

8. The apparatus of claim 1, wherein the second container is a base storage unit.

9. The apparatus of claim 1, wherein the first container is a base storage unit.

10. The apparatus of claim 1, wherein the second container is a toolbox.

11. The apparatus of claim 10, wherein the toolbox comprises a telescopic handle.

12. The apparatus of claim 1, further comprising one or more rotatable ground engaging wheels mounted toward the bottom of the apparatus for rotation about an axis to provide rolling support of the apparatus.

13. The apparatus of claim 12, wherein the one or more rotatable ground engaging wheels are mounted to the second container.

14. The apparatus of claim 12, further comprising a manually engageable pulling handle, the pulling handle and the one or more ground engaging wheels being arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction.

15. The apparatus of claim 14, wherein the manually engageable pulling handle is provided on the first container.

16. The apparatus of claim 15, wherein the first container further comprises a carrying handle separate from the manually engageable pulling handle.

17. The apparatus of claim 1, wherein the apparatus comprises a manually engageable pulling handle.

18. The apparatus of claim 17, wherein the manually engageable pulling handle is provided on the first container, and wherein the first container further comprises a carrying handle separate from the manually engageable pulling handle.

19. The apparatus of claim 1, wherein the latch comprises a pair of side portions and an upper portion connecting the side portions to each other.

20. The apparatus of claim 19, wherein the third container comprises grooves constructed and arranged to receive the side portions of the latch when the first and second containers are latched in the second configuration with the third container provided therebetween.

21. An apparatus for transporting articles between working locations, comprising:
    one or more rotatable ground engaging wheels mounted towards the bottom of the apparatus for rotation about an axis to provide rolling support for the apparatus;
    a manually engageable pulling handle, the pulling handle and the one or more ground engaging wheels being arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction;
    a first container comprising a first latch engagement structure and a second latch engagement structure;
    a second container comprising a latch, wherein the latch is constructed and arranged to selectively engage with 1) the first latch engagement structure of the first container to latch the first and second containers in a first configuration or 2) the second latch engagement structure of the first container to latch the first and second containers in a second configuration;
    a third container configured to selectively separate the first and second containers,
    wherein in the first configuration, one of the first and second containers is arranged on top of the other of the first and second containers without the third container therebetween,
    wherein in the second configuration, the third container is provided between the first and second containers, separating the first and second containers; and wherein each of the first container and the second container comprise a bottom wall therein.

* * * * *